United States Patent
Zupanick

(10) Patent No.: US 6,708,764 B2
(45) Date of Patent: Mar. 23, 2004

(54) UNDULATING WELL BORE

(75) Inventor: Joseph A. Zupanick, Pineville, WV (US)

(73) Assignee: CDX Gas, L.L.C., Dallas, TX (US)

( * ) Notice: Subject to any disclaimer, the term of this patent is extended or adjusted under 35 U.S.C. 154(b) by 0 days.

(21) Appl. No.: 10/194,366

(22) Filed: Jul. 12, 2002

(65) Prior Publication Data

US 2004/0007351 A1 Jan. 15, 2004

(51) Int. Cl.$^7$ ............................................. E21B 43/14
(52) U.S. Cl. .................... 166/313; 166/50; 175/61; 175/62
(58) Field of Search .................. 166/313, 50, 52, 166/245; 175/61, 62

(56) References Cited

U.S. PATENT DOCUMENTS

| | | | |
|---|---|---|---|
| 54,144 A | 4/1866 | Hamar | |
| 274,740 A | 3/1883 | Douglass | |
| 526,708 A | 10/1894 | Horton | |
| 639,036 A | 12/1899 | Heald | |
| 1,189,560 A | 7/1916 | Gondos | |
| 1,285,347 A | 11/1918 | Otto | |
| 1,467,480 A | 9/1923 | Hogue | |
| 1,485,615 A | 3/1924 | Jones | |
| 1,520,737 A | 12/1924 | Wright | |
| 1,674,392 A | 6/1928 | Flansburg | |
| 1,777,961 A | 10/1930 | Capeliuschnicoff | |
| 2,018,285 A | 10/1935 | Schweitzer et al. | 166/21 |
| 2,069,482 A | 2/1937 | Seay | 255/76 |
| 2,150,228 A | 3/1939 | Lamb | 166/10 |
| 2,169,718 A | 8/1939 | Boll et al. | 255/24 |
| 2,280,851 A * | 4/1942 | Ranney | 175/61 |
| 2,335,085 A | 11/1943 | Roberts | 251/197 |
| 2,450,223 A | 9/1948 | Barbour | 255/76 |
| 2,490,350 A | 12/1949 | Grable | 166/4 |
| 2,679,903 A | 6/1954 | McGowen, Jr. et al. | 166/1 |

(List continued on next page.)

FOREIGN PATENT DOCUMENTS

| | | | | |
|---|---|---|---|---|
| EP | 0 875 661 A1 | 11/1998 | | E21B/43/30 |
| EP | 0 952 300 A1 | 10/1999 | | E21B/7/12 |
| FR | 964503 | 4/1944 | | 8/1 |
| GB | 2 347 157 A | 8/2000 | | E21B/43/00 |
| WO | 94/21889 | 9/1994 | | E21B/43/24 |
| WO | WO 99/60248 | 11/1999 | | E21B/43/30 |
| WO | WO 00/31376 A2 * | 6/2000 | | |
| WO | 00/31376 | 6/2000 | | E21C/41/00 |
| WO | WO 00/79099 | 12/2000 | | E21B/43/25 |
| WO | WO 02/059455 | 8/2002 | | E21B/43/00 |

OTHER PUBLICATIONS

Chi, Weiguo, "A Feasible Discussion on Exploitation Coalbed Methane through Horizontal Network Drilling in China", SPE 64709, Society of Petroleum Engineers (SPE International), 4 pages, Nov. 7, 2000.

Chi, Weiguo, "Feasibility of Coalbed Methane Exploitation in China", synopsis of paper SPE 64709, 1 page, Nov. 7, 2000.

(List continued on next page.)

Primary Examiner—John Kreck
(74) Attorney, Agent, or Firm—Baker Botts L.L.P.

(57) ABSTRACT

In accordance with one embodiment of the present invention, a subterranean drainage pattern for accessing a subterranean zone includes at least one undulating well bore. The undulating well bore includes at least one inclining portion drilled through the subterranean zone at an inclination sloping toward an upper boundary of the single layer of subterranean deposits and at least one declining portion drilled through the subterranean zone at a declination sloping toward a lower boundary of the single layer of subterranean deposits. At least one bending portion couples the at least one inclining portion and the at least one declining portion to form a waveform.

24 Claims, 8 Drawing Sheets

U.S. PATENT DOCUMENTS

| | | | |
|---|---|---|---|
| 2,726,063 A | 12/1955 | Ragland et al. ............... 255/1.8 |
| 2,726,847 A | 12/1955 | McCune et al. ............. 255/1.6 |
| 2,783,018 A | 2/1957 | Lytle ........................... 251/25 |
| 2,847,189 A | 8/1958 | Shook ......................... 255/76 |
| 2,911,008 A | 11/1959 | Du Bois ............... 137/625.31 |
| 2,980,142 A | 4/1961 | Turak ..................... 137/637.3 |
| 3,347,595 A | 10/1967 | Dahms et al. ................. 299/4 |
| 3,443,648 A | 5/1969 | Howard ..................... 175/103 |
| 3,473,571 A | 10/1969 | Dugay ..................... 137/625.4 |
| 3,503,377 A | 3/1970 | Beatenbough et al. ...... 123/117 |
| 3,528,516 A | 9/1970 | Brown ....................... 175/267 |
| 3,530,675 A | 9/1970 | Turzillo ......................... 61/35 |
| 3,684,041 A | 8/1972 | Kammerer, Jr. et al. .... 175/267 |
| 3,692,041 A | 9/1972 | Bondi ........................ 137/238 |
| 3,757,876 A | 9/1973 | Pereau ....................... 175/267 |
| 3,757,877 A | 9/1973 | Leathers ..................... 175/269 |
| 3,800,830 A | 4/1974 | Etter ..................... 137/625.41 |
| 3,809,519 A | 5/1974 | Garner ....................... 425/245 |
| 3,823,787 A | * 7/1974 | Haworth et al. ......... 340/853.6 |
| 3,825,081 A | 7/1974 | McMahon .................. 175/73 |
| 3,828,867 A | 8/1974 | Elwood ....................... 175/45 |
| 3,874,413 A | 4/1975 | Valdez .................. 137/625.47 |
| 3,887,008 A | 6/1975 | Canfield .................... 166/267 |
| 3,902,322 A | 9/1975 | Watanabe ..................... 61/35 |
| 3,934,649 A | 1/1976 | Pasini, III et al. .......... 166/254 |
| 3,957,082 A | 5/1976 | Fuson et al. ........... 137/625.41 |
| 3,961,824 A | 6/1976 | Van Eek et al. ............... 299/17 |
| 4,011,890 A | 3/1977 | Andersson ............... 137/625.4 |
| 4,022,279 A | 5/1977 | Driver ....................... 166/271 |
| 4,037,658 A | 7/1977 | Anderson .................. 166/272 |
| 4,073,351 A | 2/1978 | Baum .......................... 175/14 |
| 4,089,374 A | 5/1978 | Terry ......................... 166/259 |
| 4,116,012 A | 9/1978 | Abe et al. .................... 405/238 |
| 4,156,437 A | 5/1979 | Chivens et al. ............. 137/554 |
| 4,169,510 A | 10/1979 | Meigs ......................... 175/65 |
| 4,189,184 A | 2/1980 | Green ........................... 299/8 |
| 4,220,203 A | 9/1980 | Steeman .................... 166/271 |
| 4,221,433 A | 9/1980 | Jacoby ........................... 299/4 |
| 4,257,650 A | 3/1981 | Allen ............................ 299/2 |
| 4,278,137 A | 7/1981 | Van Eek .................... 175/267 |
| 4,283,088 A | 8/1981 | Tabakov et al. ............... 299/2 |
| 4,296,785 A | 10/1981 | Vitello et al. ............... 141/105 |
| 4,299,295 A | 11/1981 | Gossard ....................... 175/45 |
| 4,303,127 A | 12/1981 | Freel et al. ................. 166/266 |
| 4,305,464 A | 12/1981 | Masszi ...................... 166/370 |
| 4,312,377 A | 1/1982 | Knecht .................. 137/625.19 |
| 4,317,492 A | 3/1982 | Summers et al. ............. 175/79 |
| 4,328,577 A | 5/1982 | Abbott et al. ................. 370/84 |
| 4,366,988 A | 1/1983 | Bodine ........................ 299/14 |
| 4,372,398 A | 2/1983 | Kuckes ........................ 175/45 |
| 4,386,665 A | * 6/1983 | Dellinger .................... 175/61 |
| 4,390,067 A | 6/1983 | Willman .................... 166/245 |
| 4,396,076 A | 8/1983 | Inoue ........................ 175/265 |
| 4,397,360 A | 8/1983 | Schmidt ....................... 175/61 |
| 4,401,171 A | 8/1983 | Fuchs ........................ 175/267 |
| 4,407,376 A | 10/1983 | Inoue ........................ 175/267 |
| 4,442,896 A | 4/1984 | Reale et al. ................ 166/278 |
| 4,494,616 A | 1/1985 | McKee ....................... 175/67 |
| 4,512,422 A | 4/1985 | Knisley ........................ 175/99 |
| 4,519,463 A | 5/1985 | Schuh ......................... 175/61 |
| 4,527,639 A | 7/1985 | Dickinson, III et al. ...... 175/61 |
| 4,532,986 A | 8/1985 | Mims et al. .................. 166/50 |
| 4,544,037 A | 10/1985 | Terry ........................ 166/369 |
| 4,558,744 A | 12/1985 | Gibb ........................ 166/335 |
| 4,565,252 A | 1/1986 | Campbell et al. ........... 175/269 |
| 4,573,541 A | 3/1986 | Josse et al. .................. 175/78 |
| 4,599,172 A | 7/1986 | Gardes ....................... 210/314 |
| 4,600,061 A | 7/1986 | Richards ..................... 175/62 |
| 4,605,076 A | 8/1986 | Goodhart ..................... 175/61 |
| 4,611,855 A | 9/1986 | Richards ....................... 299/2 |
| 4,618,009 A | 10/1986 | Carter et al. ................ 175/267 |
| 4,638,949 A | 1/1987 | Mancel ....................... 239/307 |
| 4,646,836 A | 3/1987 | Goodhart .................... 166/303 |
| 4,662,458 A | * 5/1987 | Ho ............................... 175/27 |
| 4,674,579 A | 6/1987 | Geller et al. .................. 175/45 |
| 4,702,314 A | 10/1987 | Huang et al. ................ 166/245 |
| 4,705,431 A | 11/1987 | Gadelle et al. ............. 405/267 |
| 4,715,440 A | 12/1987 | Boxell et al. ............... 166/100 |
| 4,733,733 A | * 3/1988 | Bradley et al. .......... 340/853.4 |
| 4,754,819 A | 7/1988 | Dellinger ..................... 175/61 |
| 4,756,367 A | 7/1988 | Puri et al. ................... 166/263 |
| 4,763,734 A | 8/1988 | Dickinson et al. ............ 175/61 |
| 4,773,488 A | 9/1988 | Bell et al. ..................... 175/61 |
| 4,830,105 A | 5/1989 | Petermann .................. 166/241 |
| 4,836,611 A | 6/1989 | El-Saie ......................... 299/7 |
| 4,842,081 A | 6/1989 | Parant ......................... 175/23 |
| 4,844,182 A | 7/1989 | Tolle ......................... 175/215 |
| 4,852,666 A | 8/1989 | Brunet et al. ................. 175/61 |
| 4,883,122 A | 11/1989 | Puri et al. ................... 166/248 |
| 4,978,172 A | 12/1990 | Schwoebel et al. ........... 299/12 |
| 5,016,710 A | 5/1991 | Renard et al. ............... 166/245 |
| 5,035,605 A | 7/1991 | Dinerman et al. ............ 481/18 |
| 5,036,921 A | 8/1991 | Pittard et al. ................ 166/298 |
| 5,074,360 A | 12/1991 | Guinn ........................ 166/281 |
| 5,074,365 A | 12/1991 | Kuckes ........................ 175/40 |
| 5,074,366 A | 12/1991 | Karlsson et al. .............. 175/76 |
| 5,082,054 A | 1/1992 | Kiamanesh ................. 166/248 |
| 5,111,893 A | 5/1992 | Kvello-Aune ............... 175/258 |
| 5,135,058 A | 8/1992 | Millgard et al. .............. 175/71 |
| 5,148,875 A | 9/1992 | Karlsson et al. .............. 175/62 |
| 5,165,491 A | 11/1992 | Wilson ........................ 175/62 |
| 5,168,942 A | 12/1992 | Wydrinski ................... 175/50 |
| 5,174,374 A | 12/1992 | Hailey ...................... 166/55.8 |
| 5,193,620 A | 3/1993 | Braddick .................... 166/382 |
| 5,194,859 A | 3/1993 | Warren .................... 340/853.4 |
| 5,197,553 A | 3/1993 | Leturno ....................... 175/57 |
| 5,197,783 A | 3/1993 | Theimer et al. ............... 299/17 |
| 5,199,496 A | 4/1993 | Redus et al. ................ 166/366 |
| 5,201,817 A | 4/1993 | Hailey ....................... 175/269 |
| 5,217,076 A | 6/1993 | Masek ........................ 166/303 |
| 5,240,350 A | 8/1993 | Yamaguchi et al. ......... 405/143 |
| 5,242,017 A | 9/1993 | Hailey ...................... 166/55.8 |
| 5,246,273 A | 9/1993 | Rosar ............................ 299/4 |
| 5,255,741 A | 10/1993 | Alexander .................. 166/278 |
| 5,271,472 A | 12/1993 | Leturno ..................... 175/107 |
| 5,301,760 A | 4/1994 | Graham ....................... 175/61 |
| 5,363,927 A | 11/1994 | Frank .......................... 175/67 |
| 5,385,205 A | 1/1995 | Hailey ...................... 166/55.8 |
| 5,394,950 A | 3/1995 | Gardes ........................ 175/45 |
| 5,402,851 A | 4/1995 | Baiton ....................... 166/369 |
| 5,411,082 A | 5/1995 | Kennedy ................... 166/181 |
| 5,411,085 A | 5/1995 | Moore et al. ............... 166/242 |
| 5,411,104 A | 5/1995 | Stanley ........................ 175/65 |
| 5,411,105 A | 5/1995 | Gray .......................... 175/69 |
| 5,431,220 A | 7/1995 | Lennon et al. ............. 166/55.7 |
| 5,435,400 A | 7/1995 | Smith ......................... 175/61 |
| 5,447,416 A | 9/1995 | Wittrisch ................... 417/442 |
| 5,450,902 A | 9/1995 | Matthews .................. 166/268 |
| 5,454,419 A | 10/1995 | Vloedman .................. 166/277 |
| 5,458,209 A | 10/1995 | Hayes et al. .................. 175/61 |
| 5,462,116 A | 10/1995 | Carroll ....................... 166/249 |
| 5,462,120 A | 10/1995 | Gondouin ................... 166/380 |
| 5,469,155 A | 11/1995 | Archambeault et al. .. 340/853.4 |
| 5,477,923 A | 12/1995 | Jordan, Jr. et al. ............. 66/313 |
| 5,485,089 A | 1/1996 | Kuckes ....................... 324/346 |
| 5,494,121 A | 2/1996 | Nackerud ................... 175/263 |
| 5,499,687 A | 3/1996 | Lee ........................... 175/317 |
| 5,501,273 A | 3/1996 | Puri ........................ 166/252.5 |
| 5,501,279 A | 3/1996 | Garg et al. ................. 166/372 |
| 5,584,605 A | 12/1996 | Beard et al. ................ 405/128 |
| 5,613,242 A | 3/1997 | Oddo ........................... 588/17 |

| | | |
|---|---|---|
| 5,615,739 A | 4/1997 | Dallas .................. 166/306 |
| 5,669,444 A | 9/1997 | Riese et al. ............ 166/263 |
| 5,680,901 A | 10/1997 | Gardes ................. 166/313 |
| 5,690,390 A | 11/1997 | Bithell .................. 299/4 |
| 5,706,871 A | 1/1998 | Anderson et al. ....... 141/59 |
| 5,720,356 A | 2/1998 | Gardes ................. 175/62 |
| 5,727,629 A | 3/1998 | Blizzard, Jr. et al. ... 166/298 |
| 5,735,350 A | 4/1998 | Longbottom et al. ... 166/313 |
| 5,771,976 A | 6/1998 | Talley .................. 166/370 |
| 5,785,133 A | 7/1998 | Murray et al. .......... 175/61 |
| 5,832,958 A | 11/1998 | Cheng .................. 137/625.41 |
| 5,853,054 A | 12/1998 | McGarian et al. ...... 175/267 |
| 5,853,056 A | 12/1998 | Landers ................ 175/424 |
| 5,863,283 A | 1/1999 | Gardes ................. 588/250 |
| 5,868,202 A | 2/1999 | Hsu ..................... 166/256 |
| 5,868,210 A | 2/1999 | Johnson et al. ......... 175/40 |
| 5,879,057 A | 3/1999 | Schwoebel et al. ..... 299/17 |
| 5,884,704 A | 3/1999 | Longbottom et al. .... 16/313 |
| 5,917,325 A | 6/1999 | Smith .................. 324/326 |
| 5,934,390 A | 8/1999 | Uthe .................... 175/67 |
| 5,957,539 A | 9/1999 | Durup et al. ........... 299/4 |
| 5,988,760 A | * 11/1999 | Durup et al. ........... 299/5 |
| 6,012,520 A | 1/2000 | Yu et al. ............... 166/245 |
| 6,024,171 A | 2/2000 | Montgomery et al. ... 166/308 |
| 6,050,335 A | 4/2000 | Parsons ................ 166/272.3 |
| 6,056,059 A | 5/2000 | Ohmer .................. 166/313 |
| 6,065,550 A | 5/2000 | Gardes ................. 175/62 |
| 6,119,771 A | 9/2000 | Gano et al. ............ 166/50 |
| 6,135,208 A | 10/2000 | Gano et al. ............ 166/313 |
| 6,209,636 B1 | 4/2001 | Roberts ................ 166/117.6 |
| 6,280,000 B1 | 8/2001 | Zupanick ............... 299/12 |
| 6,349,769 B1 | 2/2002 | Ohmer .................. 166/313 |
| 6,357,523 B1 | 3/2002 | Zupanick ............... 166/52 |
| 6,425,448 B1 | 7/2002 | Zupanick et al. ....... 175/61 |
| 6,439,320 B2 | 8/2002 | Zupanick ............... 175/161 |
| 6,450,256 B2 | 9/2002 | Mones .................. 166/250.01 |
| 2003/0062198 A1 | 4/2003 | Gardes ................. 175/61 |
| 2003/0075334 A1 | 4/2003 | Haugen et al. .......... 166/313 |

OTHER PUBLICATIONS

Ian D. Palmer et al., "Coalbed Methane Well Completions and Stimulations", Chapter 14, pp. 303–339, Hydrocarbons from Coal, Published by the American Association of Petroleum Geologists, 1993.

Joseph A. Zupanick et al., U.S. patent application Ser. No. 10/123,561, entitled "Method and System for Accessing Subterranean Zones From a Limited Surface," filed Apr. 5, 2002, 49 pages.

Joseph A. Zupanick et al., U.S. patent application Ser. No. 10/123,556, entitled "Method and System for Accessing Subterranean Zones From a Limited Surface," filed Apr. 5, 2002, 49 pages.

Joseph A. Zupanick, U.S. patent application Ser. No. 10/188,141, entitled, "Method and System for Accessing a Subterranean Zone From a Limited Surface", filed Jul. 1, 2002, 46 pages.

Joseph A. Zupanick, U.S. patent application Ser. No. 10/194,366, entitled, "Undulating Well Bore", filed Jul. 12, 2002, 36 pages.

R.J. "Bob" Stayton, "Horizontal Wells Boost CBM Recovery", Special Report: Horizontal & Directional Drilling, *The American Oil & Gas Reporter*, pp. 71.75, Aug. 2002.

Kelley et al., U.S. patent application publication No. U.S. 2002/0074122 A1 Method and Apparatus for Hydrocarbon Subterranean Recover, Jun. 20, 2002.

Susan Eaton, "Reversal of Fortune", New Technology Magazine, pp. 30–31, Sep. 2002.

James Mahony, "A Shadow of Things to Come", New Technology Magazine, pp. 28–29, Sep. 2002.

Documents Received from Third Party, Great Lakes Directional Drilling, Inc., (12 pages), Received Sep. 12, 2002.

McCray and Cole, "Oil Well Drilling and Technology," *University of Oklahoma Press*, pp. 315–319, 1959.

Berger and Anderson, "Modern Petroleum;" *PennWell Books*, pp. 106–108, 1978.

Howard L. Hartman, et al.; "SME Mining Engineering Handbook;" *Society for Mining, Metallurgy, and Exploration, Inc.*; pp. 1946–1950, 2nd Edition, vol. 2, 1992.

Dave Hassan, Mike Chernichen, Earl Jensen, and Morley Frank; "Multi–lateral technique lowers drilling costs, provides environmental benefits", *Drilling Technology*, pp. 41–47, Oct. 1999.

Joseph A. Zupanick; Declaration of Experimental Use with attached Exhibits A–D, dated Nov. 12, 2000, 308 total pages.

Gopal Ramaswamy, "Production History Provides CBM Insights," *Oil & Gas Journal*, pp. 49, 50 and 52, Apr. 2, 2001.

Weiguo Chi and Luwu Yang, "Feasibility of Coalbed Methane Exploitation in China," *Horizontal Well Technology*, p. 74, Sep. 2001.

Nackerud Product Description, *Harvest Tool Company,LLC*, 1 page, Received Sep. 27, 2001.

U.S. patent application Ser. No. 09/444,029, entitled "Method and System for Accessing Subterranean Deposits From The Surface," filed Nov. 19, 1999, 52 pages.

U.S. patent application Ser. No. 09/773,217, entitled "Method and System for Accessing Subterranean Zones From a Limited Surface Area", filed Jan. 30, 2001, 72 pages.

U.S. patent application Ser. No. 09/769,098, entitled "Method and System for Enhanced Access to a Subterranean Zone," filed Jan. 24, 2001, 65 pages.

U.S. patent application Ser. No. 10/142,817, entitled "Method and System for Underground Treatment of Materials," filed May 8, 2002, 54 pgs, May 2, 2002.

U.S. patent application Ser. No. 09/774,996, entitled "Method and System for Accessing a Subterranean Zone From a Limited Surface Area," filed Jan. 30, 2001, 67 pages.

U.S. patent application Ser. No. 09/932,482, entitled "Single–Blade Underreamer," filed Aug. 17, 2001, 38 pages.

U.S. patent application Ser. No. 09/929,551, entitled "Pantograph Underreamer," filed Aug. 13, 2001, 27 pages.

U.S. patent application Ser. No. 10/046,001, entitled "Method and System for Management of By–Products From Subterranean Zones," filed Oct. 19, 2001. 42 pages.

U.S. patent application Ser. No. 09/932,487, entitled "Multi–Blade Underreamer," filed Aug. 17, 2001, 38 pages.

U.S. patent application Ser. No. 09/789,956, entitled "Method and System for Accessing Subterranean Deposits From The Surface," filed Feb. 20, 2001, 54 pages.

U.S. patent application Ser. No. 09/788,897, entitled "Method and System for Accessing Subterranean Deposits From The Surface," filed Feb. 20, 2001, 54 pages.

U.S. patent application Ser. No. 09/791,033, entitled "Method and System for Accessing Subterranean Deposits From The Surface," filed Feb. 20, 2001, 50 pages.

U.S. patent application Ser. No. 09/885,219, entitled "Method and System for Accessing Subterranean Deposits From The Surface," filed Jun. 20, 2001, 52 pages.

U.S. patent application Ser. No. 09/929,175, entitled "Pantograph Underreamer," filed Aug. 13, 2001, 24 pages.

U.S. patent application Ser. No. 09/929,568, entitled "Pantograph Underreamer," filed Aug. 13, 2001, 25 pages.

U.S. patent application Ser. No. 10/003,917, entitled "Method and System for Surface Production of Gas from a Subterranean Zone," filed Nov. 1, 2001, 75 pages.

U.S. patent application Ser. No. 10/004,316, entitled "Slant Entry Well System and Method," filed Oct. 30, 2001, 35 pages.

U.S. patent application Ser. No. 10/165,627, entitled "Method and System for Accessing Subterranean Deposits from the Surface," filed Jun. 7, 2002, 26 pages.

U.S. patent application No. 10/165,625, entitled "Method and System for Accessing Subterranean Deposits from the Surface," filed Jun. 7, 2002, 26 pages.

U.S. patent application Ser. No. 10/079,444, entitled "Pantograph Underreamer," filed Feb. 19, 2002, 32 pages.

Gopal Ramaswamy, "Advances Key For Coalbed Methane," *The American Oil & Gas Reporter*, pp. 71 & 73, Oct. 2001.

Arfon H. Jones et al., A Review of the Physical and Mechanical Properties of Coal with Implications for Coal–Bed Methane Well Completion and Production, *Rocky Mountain Association of Geologists*, pp. 169–181, 1988.

Joseph C. Stevens, Horizontal Applications For Coal Bed Methane Recovery, *Strategic Research Institute*, pp. 1–10 (slides), Mar. 25, 2002.

Robert W. Taylor and Richard Russell, Multilateral Technologies Increase Operational Efficiencies in Middle East, Oil & Gas Journal, pp. 76–80, Mar. 16, 1998.

Adam Pasiczynk, "Evolution Simplifies Multilateral Wells", Directional Drilling, pp. 53–55, Jun. 2000.

Steven S. Bell, "Multilateral System with Full Re–Entry Access Installed", World Oil, p. 29, Jun. 1996.

P. Jackson and S. Kershaw, Reducing Long Term Methane Emissions Resulting from Coal Mining, Energy Convers. Mgmt, vol. 37, Nos 6–8, pp. 801–806, 1996.

Pascal Breant, "Des Puits Branches, Chez Total : les puits multi drains", Total Exploration Production, pp. 1–5, Jan. 1999.

\* cited by examiner

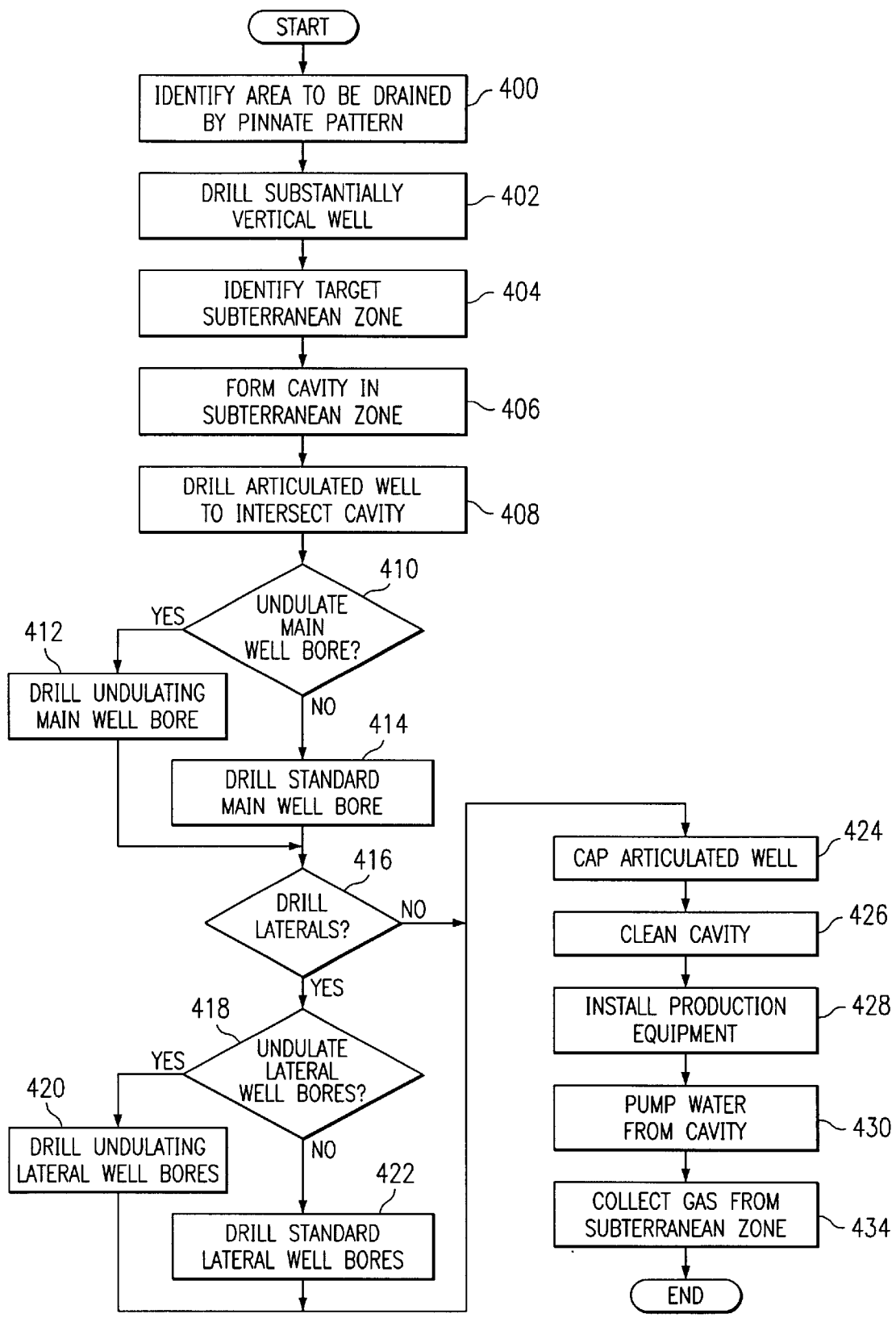

UNDULATING WELL BORE

TECHNICAL FIELD OF THE INVENTION

The present invention relates generally to the recovery of subterranean deposits, and more particularly to a method and system for accessing subterranean deposits from the surface.

BACKGROUND OF THE INVENTION

Subterranean deposits of coal typically contain substantial quantities of entrained methane gas. There are many uses for methane gas extracted from subterranean deposits. Substantial obstacles, however, have frustrated more extensive development and use of methane gas deposits in coal seams. A common problem in producing methane gas from coal seams may be vertical separation of multiple thin layers of coal within a coal seam. Although coal seams may extend over large areas of up to several thousand acres, the depth of the multiple layers in the coal seam may vary from very shallow to very deep. Vertical wells drilled into the coal deposits for obtaining methane gas can only drain a fairly small radius of methane gas around the vertical well. Further, coal deposits are not amenable to pressure fracturing and other methods often used for increasing gas production from conventional rock formations. As a result, production of gas may be limited in volume. Additionally, coal seams are often associated with subterranean water, which must be drained from the coal seam in order to produce the methane.

SUMMARY OF THE INVENTION

The present invention provides an improved method and system for accessing subterranean deposits from the surface that substantially eliminates or reduces the disadvantages and problems associated with previous systems and methods. In particular, the present invention provides an articulated well with a drainage pattern that provides access to a large subterranean area from the surface.

In accordance with one embodiment of the present invention, a subterranean drainage pattern for accessing a subterranean zone includes at least one undulating well bore. The undulating well bore includes at least one inclining portion drilled through the subterranean zone at an inclination sloping toward an upper boundary of the single layer of subterranean deposits and at least one declining portion drilled through the subterranean zone at a declination sloping toward a lower boundary of the single layer of subterranean deposits. At least one bending portion couples the at least one inclining portion and the at least one declining portion to form a waveform.

Embodiments of the present invention may have some, all, or none of the following technical advantages. In particular embodiments, an improved drainage pattern may include undulating well bores that provide access to multiple regions of the subterranean zone. For example, a pinnate drilling pattern may include a main well bore and multiple opposed lateral well bores. The main well bore, the opposed lateral well bores, or both may include undulating well bores to maximize access to a subterranean zone from a single vertical well bore. In one embodiment, undulating well bores may provide access to minerals and gas contained in a very thick layer of subterranean deposits. In another embodiment, undulating well bores may provide access to multiple layers of subterranean deposits separated by layers of impermeable or substantially impermeable material. The length of undulating well bore may be increased to maximize the area horizontally covered by the undulating well bore. Similarly, the height of the undulating well bore may be increased to maximize the area vertically covered by the undulating well bores.

Other technical advantages of the present invention will be readily apparent to one skilled in the art from the figures, description, and claims, included herein.

BRIEF DESCRIPTION OF THE DRAWINGS

For a more complete understanding of the present invention and its advantages, reference is now made to the following description taken in conjunction with the accompanying drawings, wherein like numerals represent like parts, in which:

FIG. 10 is a flow diagram illustrating an example method for producing gas from a subterranean zone.

DETAILED DESCRIPTION OF THE INVENTION

Figure 1:
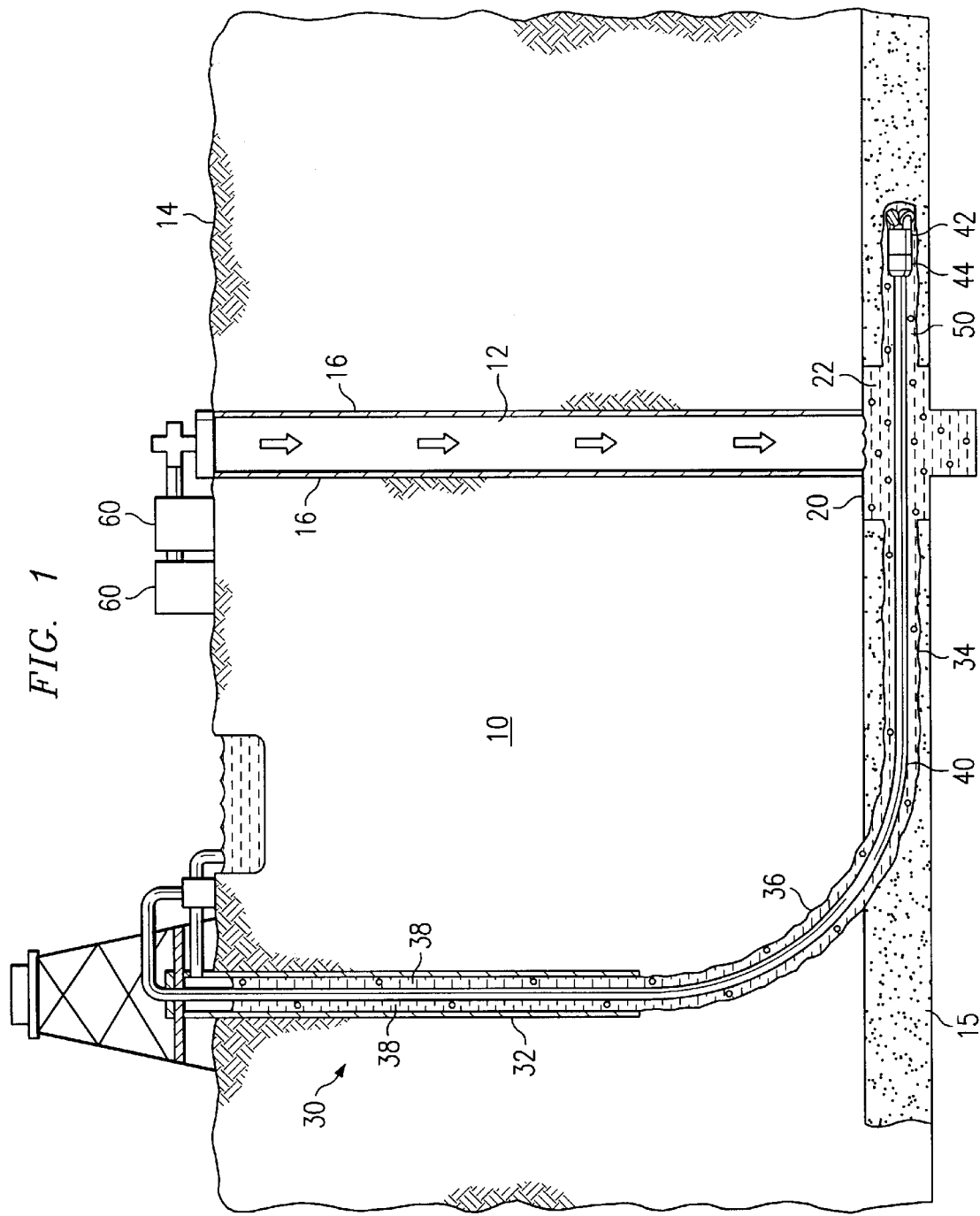
FIG. 1 is a cross-sectional diagram illustrating the drilling of an example dual well system for accessing a subterranean zone from the surface.

FIG. 1 is a cross-sectional diagram illustrating the drilling of an example dual well system for accessing a subterranean zone from the surface. In one embodiment, the subterranean zone may be a coal seam. It will be understood that other subterranean zones can be similarly accessed using the dual well system of the present invention to remove and/or produce water, hydrocarbons and other fluids in the zone and to treat minerals in the zone prior to mining operations.

In addition to production, the dual well system may be used for environmental remediation purposes to treat or recover underground contaminants posing a danger to the environment. Remediation may include neutralizing leaching recovery, dissolving, oxidation, reduction, or other suitable process. For example, the dual well system may be used to inject a treatment solution into a contaminated coal seam or surrounding area. The treatment solution may comprise either a liquid or a gas. Where treatment includes biological processes or biological mediated processes (including bioremediation), the treatment solution may include bacteria, nutrients, or other materials which may affect the metabolism, respiration, or other processes of bacteria or other organisms. The dual well system may also be used to recover byproducts from the contaminated coal seam or surrounding area or to strip recoverable product from the coal seam.

Dual well system may also be used for the sequestration of gaseous emissions from internal combustion engines, or other materials for which disposal by underground sequestration may be appropriate. For example, certain underground formations such as coal have high absorption affinities for carbon dioxide, sulfur oxides, nitrogen oxides, and/or other gases or other materials that may comprise regulated substances or pollutants. Thus, materials such as carbon dioxide may be sequestered in a sequestration zone such as a coal seam. Well bore patterns may be drilled proximate to the sequestration zone (adjacent to and/or within the zone) and the materials injected into the well bore patterns. In a particular embodiment, the materials comprise gases such as carbon dioxide that may first be entrained in water or another liquid. The liquid may act as a carrier medium, and the gas/carrier medium mixture pumped into the well bore patterns with the aid of a surface pump. The pinnate pattern may provide for an increased surface area of the underground injection zone, thus providing for more efficient and effective sequestration.

Referring to FIG. 1, a substantially vertical well bore 12 extends from the surface 14 to a target layer subterranean zone 15. The substantially vertical well bore 12 intersects, penetrates and continues below the subterranean zone 15. The substantially vertical well bore may be lined with a suitable well casing 16 that terminates at or above the level of the coal seam or other subterranean zone 15.

The substantially vertical well bore 12 may be logged either during or after drilling in order to locate the exact vertical depth of the target subterranean zone 15. As a result, subterranean zone 15 is not missed in subsequent drilling operations, and techniques used to locate the zone 15 while drilling need not be employed. An enlarged diameter cavity 20 may be formed in the substantially vertical well bore 12 at a level of or in the subterranean zone 15. As described in more detail below, the enlarged diameter cavity 20 provides a junction for intersection of the substantially vertical well bore 12 by an articulated well bore 30 used to form a drainage pattern in the subterranean zone 15. However, drilling techniques may also be used that eliminate the need for an enlarged cavity in order to intersect vertical well bore 12. The enlarged diameter cavity 20 also may provide a collection point for fluids drained from the subterranean zone 15 during production operations.

In one embodiment, the enlarged diameter cavity 20 has a radius of approximately eight feet and a vertical dimension that equals or exceeds the vertical dimension of the subterranean zone 15; however, any appropriate radius may be used (and the cavity many not be cylindrical) and the vertical dimension of the cavity many not extend out of subterranean zone 15. The enlarged diameter cavity 20 may be formed using suitable under-reaming techniques and equipment. A vertical portion of the substantially vertical well bore 12 may continue below the enlarged diameter cavity 20 to form a sump 22 for the cavity 20.

An articulated well bore 30 extends from the surface 14 to the enlarged diameter cavity 20 of the substantially vertical well bore 12. The articulated well bore 30 may include a substantially vertical portion 32, a substantially horizontal portion 34, and a curved or radiused portion 36 interconnecting the vertical and horizontal portions 32 and 34. In one embodiment, the horizontal portion 34 lies substantially in the horizontal plane of subterranean zone 15 and intersects the large diameter cavity 20 of the substantially vertical well bore 12. One skilled in the art may recognize, however, that the substantially horizontal portion 34 need not be precisely horizontal where the subterranean zone itself is not precisely horizontal. Rather, substantially horizontal portion 34 merely implies that the portion 34 is in conformance with the general shape of subterranean zone 15. Thus, if subterranean zone 15 is inclined, substantially horizontal portion 34 may also be inclined in conformance with the plane of the subterranean zone 15.

Articulated well bore 30 is offset a sufficient distance from the substantially vertical well bore 12 at the surface 14 to permit the large radius curved section 36 and any desired horizontal section 34 to be drilled before intersecting the enlarged diameter cavity 20. In one embodiment, the articulated well bore 30 is offset a distance of about three hundred feet from the substantially vertical well bore 12 to provide the curved portion 36 with a radius of one hundred to one hundred and fifty feet. This spacing minimizes the radius of the curved portion 36 to reduce friction in the bore 30 during drilling operations. As a result, reach of the articulated drill string drilled through the articulated well bore 30 is maximized. One skilled in the art may recognize, however, that a distance of three hundred feet and a radius of one hundred to one hundred and fifty feet is merely exemplary. The radius of curved portion 36 may be any other suitable radius that allows articulated well bore to curve and access subterranean zone 15. Accordingly, the distance between the articulated well bore 30 and the substantially vertical well bore 12 may be any suitable distance allowing the articulated well bore 30 to intersect the enlarge diameter cavity 20.

Articulated well bore 30 may be drilled using articulated drill string 40 that includes a suitable down-hole motor and bit 42. A measurement while drilling (MWD) device 44 may be included in the articulated drill string 40 for controlling the orientation and direction of the well bore drilled by the motor and bit 42. Any portion of the articulated well bore 30 may be lined with a suitable casing 38.

After the enlarged diameter cavity 20 has been successfully intersected by the articulated well bore 30, drilling is continued through the cavity 20 using the articulated drill string 40 and appropriate horizontal drilling apparatus to provide a drainage pattern in the subterranean zone 15 that initiates from cavity 20 as main well bore 50. Main well bore 50 and other such well bores may include sloped, undulating, or other inclinations of the coal seam or other subterranean zone 15. Although FIG. 1 shows only a beginning portion of the main well bore 50, main well bore 50 may extend further into subterranean zone 15. Additional well bores may extend from the main well bore 50 to form a drainage pattern. During this operation, gamma ray logging tools and conventional MWD devices may be employed to control and direct the orientation of the drill bit to retain the main well bore 50 within the confines of the subterranean zone 15 and to provide substantial coverage of a desired area within the subterranean zone 15. Various types of drainage patterns are described in more detail below in connection with FIGS. 4–14.

During the process of drilling the drainage pattern 50, drilling fluid or "mud" may be pumped down the articulated drill string 40 and circulated out of the drill string 40 in the vicinity of the bit 42. Mud may be used to scour the formation and to remove formation cuttings. The cuttings are then entrained in the drilling fluid which circulates up through the annulus between the drill string 40 and the well bore walls until it reaches the surface 14. Cuttings may be removed from the drilling fluid and the fluid may then be recirculated. This conventional drilling operation produces a standard column of drilling fluid having a vertical height equal to the depth of the well bore 30 and produces a hydrostatic pressure on the well bore corresponding to the well bore depth. Because coal seams tend to be porous and fractured, they may be unable to sustain such hydrostatic pressure, even if formation water is also present in the coal seam. Accordingly, if the full hydrostatic pressure is allowed to act on the coal seam, the result may be loss of drilling fluid and entrained cuttings into the formation. Such a circumstance is referred to as an "over-balanced" drilling operation in which the hydrostatic fluid pressure in the well bore exceeds the ability of the formation to withstand the pressure. Loss of drilling fluids in cuttings into the formation not only is expensive in terms of the lost drilling fluids, which must be made up, but it tends to plug the pores in the coal seam, which are needed to drain the coal seam of gas and water.

To prevent over balance drilling conditions during formation of drainage pattern that may include main well bore 50, air compressors 60 may be provided to circulate compressed air down the substantially vertical well bore 12 and back up through the articulated well bore 30. The circulated air will admix with the drilling fluids in the annulus around the articulated drill string 40 and create bubbles throughout the column of drilling fluid. This has the effect of lightening the hydrostatic pressure of the drilling fluid and reducing the down-hole pressure sufficiently such that drilling conditions do not become over-balanced. Aeration of the drilling fluid may reduce down-hole pressure to approximately 150–200 pounds per square inch (psi), in particular embodiments. Accordingly, low-pressure coal seams and other subterranean zones can be drilling without substantial loss of drilling fluid and contamination of the zone by the drilling fluid.

Foam, which may include compressed air mixed with water, may be circulated down through the articulated drill string 40 along with the drilling mud in order to aerate the drilling fluid in the annulus, if desired, as the drainage pattern is being drilled. Drilling of the drainage pattern with the use of an air hammer bit or an air-powered down-hole motor will also supply compressed air or foam to the drilling fluid. In this case, the compressed air or foam, which is used to power the bit or down-hole motor, exits in the vicinity of the drill bit 42. However, the larger volume of air which can be circulated down the substantially vertical well bore 12, permits greater aeration of the drilling fluid than generally is possible by air supplied through the articulated drill string 40.

Figure 2:
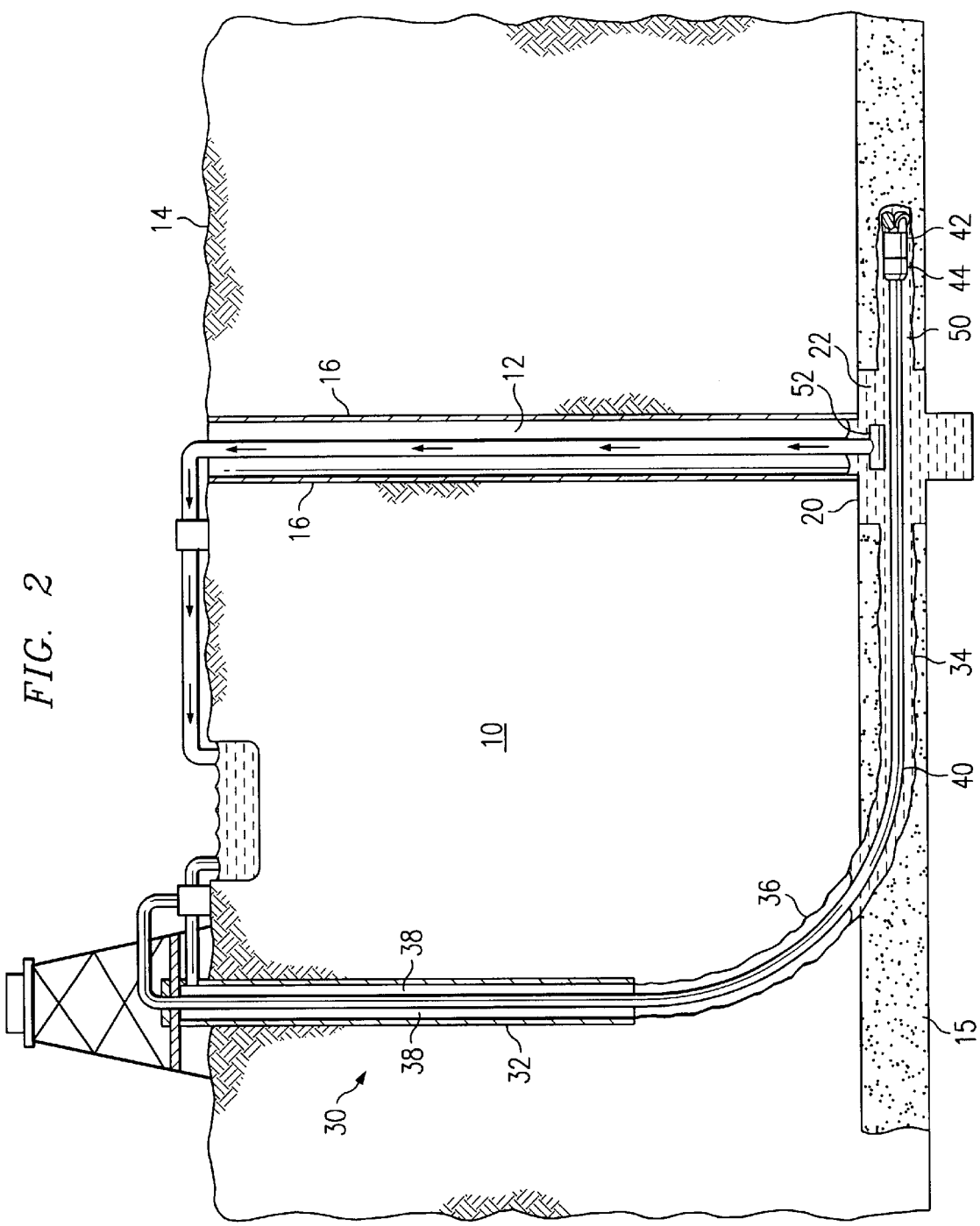
FIG. 2 is a cross-sectional diagram illustrating the drilling of an example dual well system for accessing a subterranean zone from the surface.

FIG. 2 is a cross-sectional diagram illustrating the drilling of an example dual well system for accessing a subterranean zone from the surface. In this embodiment, the substantially vertical well bore 12, enlarged diameter cavity 20 and articulated well bore 32 may be positioned and formed as previously described in connection with the FIG. 1.

Referring to FIG. 2, after intersection of the enlarged diameter cavity 20 by the articulated well bore 30, a pump 52 is installed in the enlarged diameter cavity 20 to pump drilling fluid and cuttings to the surface 14 through the substantially vertical well bore 12. This eliminates the variable friction of air and fluid returning up the articulated well bore 30 and reduces down-hole pressure to any desired value. Accordingly, coal seams and other subterranean zones having ultra low pressures below 150 psi can be accessed from the surface 14. Additionally, the risk of combining air and methane in the well is eliminated.

Figure 3:
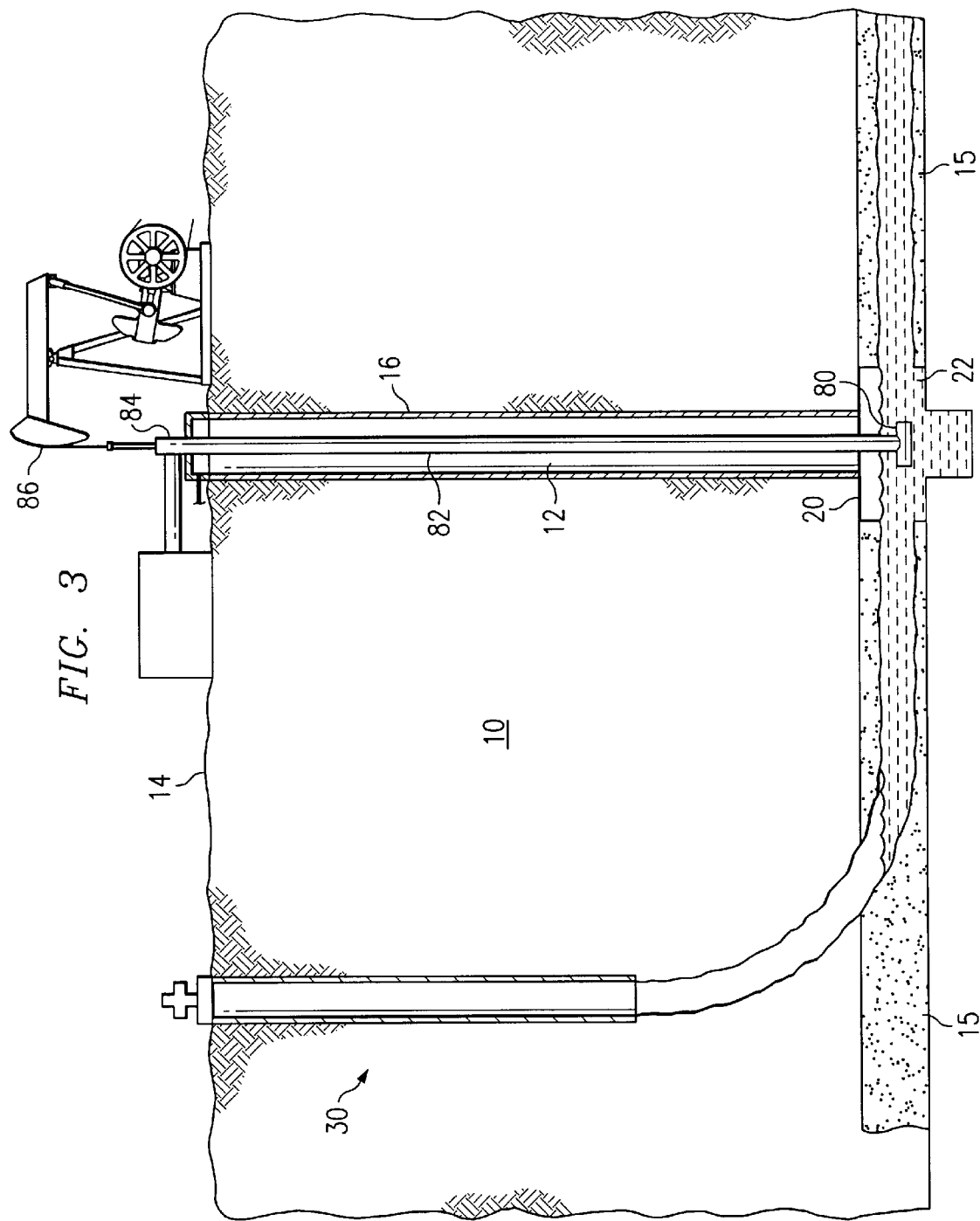
FIG. 3 is a cross-sectional diagram illustrating the use of an example dual well system for the production of fluids.

FIG. 3 is a cross-sectional diagram illustrating the use of an example dual well system for the production of fluids. In this embodiment, after the substantially vertical and articulated well bores 12 and 30 as well as desired drainage pattern have been drilled, the articulated drill string 40 is removed from the articulated well bore 30 and the articulated well bore is capped. A down hole pump 80 is disposed in the substantially vertical well bore 12 in the enlarged diameter cavity 20. The enlarged cavity 20 provides a reservoir for accumulated fluids allowing intermittent pumping without adverse effects of a hydrostatic head caused by accumulated fluids in the vertical well bore 12.

The down hole pump 140 is connected to the surface 14 via a tubing string 82 and may be powered by sucker rods 84 extending down through the well bore 12 of the tubing. The sucker rods 84 are reciprocated by a suitable surface mounted apparatus, such as a powered walking beam 86 to operate the down hole pump 80. The down hole pump 80 may be used to remove water and entrained fines from the subterranean zone 15 via the drainage pattern. Alternatively or additionally, down hole pump 80 may be used in remediation processes to inject treatment solution into a contaminated area or in sequestration processes to inject gaseous emissions entrained in a carrier medium. Once the water is removed to the surface, it may be treated to remove methane or other gas dissolved in the water and entrained fines. After sufficient water has been removed from the subterranean, gas may be allowed to flow to the surface 14 through the annulus of the substantially vertical well bore 12 around the tubing string 82 and removed via piping attached to a wellhead apparatus. At the surface 14, the gas may be treated, compressed and pumped through a pipeline for use as a fuel in a conventional manner. The down hole pump 80 may be operated continuously or as needed to remove water drained from the coal seam into the enlarged diameter cavity 20.

Figure 4:
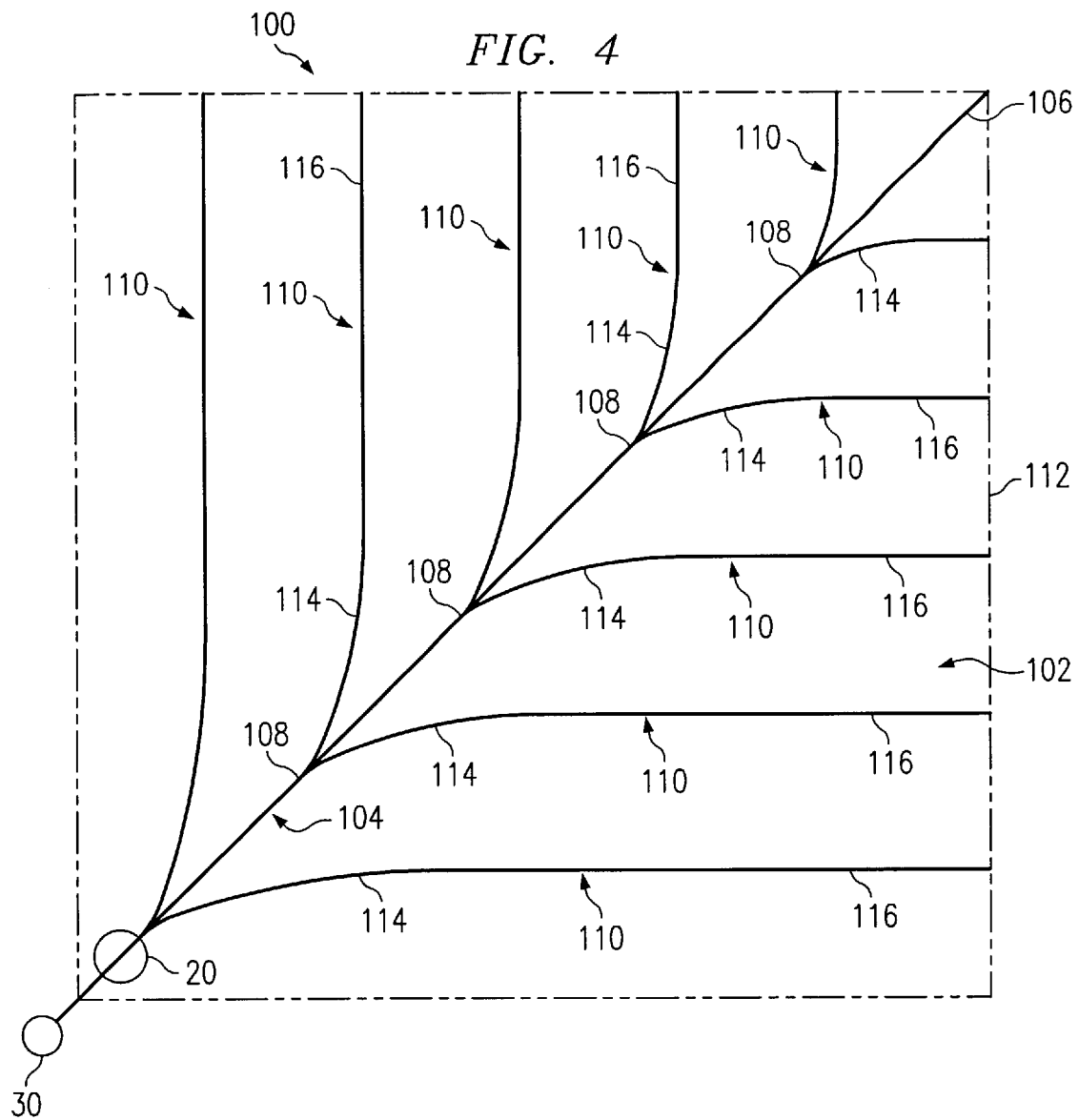
FIG. 4 is a top plan diagram illustrating an example pinnate drainage pattern for accessing deposits in a subterranean zone.
Figure 5:
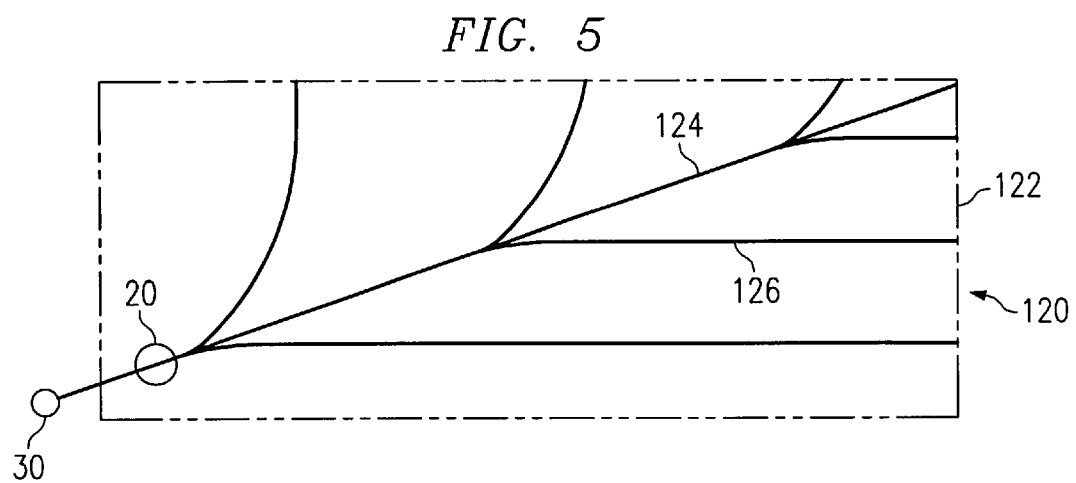
FIG. 5 is a top plan diagram illustrating an example pinnate drainage pattern for accessing deposits in a subterranean zone.
Figure 6:
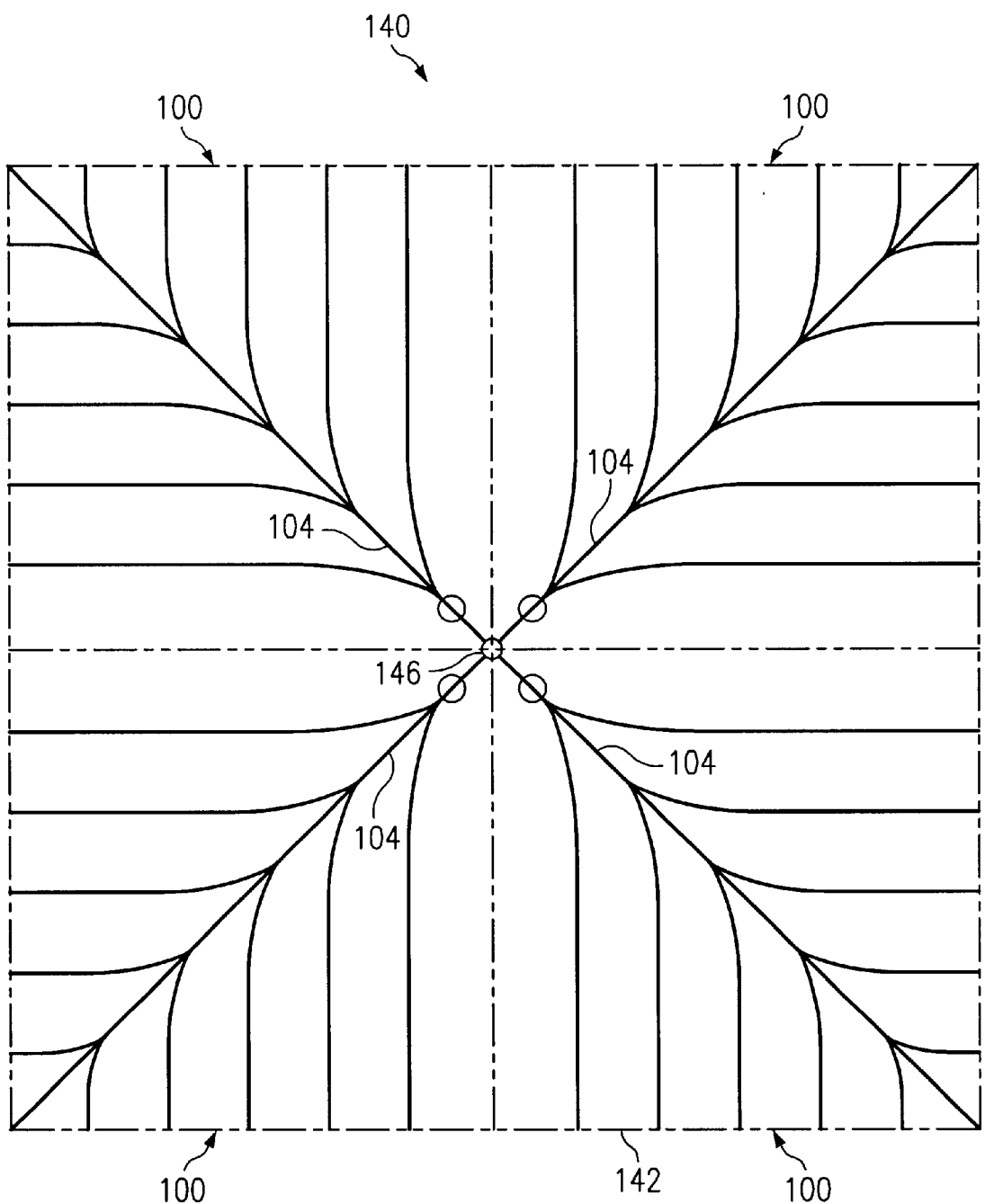
FIG. 6 is a top plan diagram illustrating an example quadrilateral pinnate drainage pattern for accessing deposits in a subterranean zone.

FIGS. 4–6 are top plan diagrams illustrating example pinnate drainage patterns for accessing deposits in a subterranean zone. In the example embodiments, the drainage patterns may comprise pinnate patterns that have a main drainage well bore 104 with generally symmetrically arranged and appropriately spaced lateral well bores 110 extending from each side of the main drainage well bore. The pinnate pattern approximates the pattern of veins in a leaf or the design of a feather in that it has similar, substantially parallel, lateral drainage bores 110 arranged in substantially equal and parallel spacing on opposite sides of an axis. The pinnate drainage pattern with its main drainage well bore 104 and generally symmetrically arranged and appropriately spaced lateral drainage bores 110 on each side provides a uniform pattern for draining fluids from a coal seam or other subterranean formation. As described in more detail below, the pinnate pattern may provide substantially uniform coverage of a square, other quadrilateral, or grid area and may be aligned with longwall mining panels for preparing the subterranean 15 for mining operations. It will be understood that other suitable drainage patterns may be used in accordance with the present invention.

The pinnate and other suitable drainage patterns drilled from the surface provide surface access to subterranean formations. The drainage pattern may be used to uniformly remove and/or insert fluids or otherwise manipulate a subterranean deposit. In non-coal applications, the drainage pattern may be used initiating in-situ burns, "huff-puff"

steam operations for heavy crude oil, and the removal of hydrocarbons from low porosity reservoirs.

FIG. 4 is a top plan diagram illustrating an example pinnate drainage pattern 100 for accessing deposits in a subterranean zone 15 in accordance with one embodiment of the present invention. In this embodiment, the pinnate drainage pattern 100 provides access to a substantially square area 102 of a subterranean zone. A number of the pinnate patterns 100 may be used together to provide uniform access to a large subterranean region.

The enlarged diameter cavity 20 defines a first corner of the area 102. The pinnate pattern 100 includes a substantially horizontal main drainage well bore 104 extending diagonally across the area 102 to a distant corner 106 of the area 102. One skilled in the art may recognize, however, that the substantially horizontal main drainage well bore 104 need not be precisely horizontal where the subterranean zone itself is not precisely horizontal. Rather, substantially horizontal merely means that well bore 104 is in conformance with the shape of subterranean zone 15. If subterranean zone 15 is inclined, the substantially horizontal main drainage well bore 104 may also be inclined in conformance with the plane of the subterranean zone 15. In particular embodiments, the substantially vertical and articulated well bores 12 and 30 may be positioned over the area 102 such that the main drainage well bore 104 is drilled up the slope of the subterranean zone 15. This may facilitate collection of water, gas from the area 102. The main drainage well bore 104 is drilled using the articulated drill string 40 and extends from the enlarged cavity 20 in alignment with the articulated well bore 30.

A plurality of lateral well bores 110 may extend from opposite sides of main drainage well bore 104 to a periphery 112 of the area 102. The lateral bores 110 may mirror each other on opposite sides of the main drainage well bore 104 or may be offset from each other along the main drainage well bore 104. Each of the lateral bores 110 includes a radiused portion 114 coming off of the main drainage well bore 104 and an elongated portion 116 formed after the curved portion 114 has reached a desired orientation. For uniform coverage of the square area 102, pairs of lateral bores 110 may be substantially evenly spaced on each side of the main drainage well bore 104 and extend from the main drainage well bore 104 at an angle of approximately 45 degrees. The lateral bores 110 may shorten in length based on progression away from the enlarged diameter cavity 20 in order to facilitate drilling of the lateral bores 110.

In a particular embodiment, a pinnate drainage pattern 100 including a main drainage well bore 104 and five pairs of lateral bores 110 may drain a subterranean zone 15 of approximately 150 acres in size. Where a smaller area is to be drained, or where the subterranean zone 15 has a different shape, such as a long, narrow shape or due to surface or subterranean topography, alternate pinnate drainage patterns may be employed by varying the angle of the lateral bores 110 to the main drainage well bore 104 and the orientation of the lateral bores 110. Alternatively, lateral bores 120 can be drilled from only one side of the main drainage well bore 104 to form a one-half pinnate pattern.

The main drainage well bore 104 and the lateral bores 110 are formed by drilling through the enlarged diameter cavity 20 using the articulated drill string 40 and appropriate horizontal drilling apparatus. During this operation, gamma ray logging tools and conventional MWD technologies may be employed to control the direction and orientation of the drill bit so as to retain the drainage pattern within the confines of the subterranean zone 15 and to maintain proper spacing and orientation of the main drainage well bore and lateral bores 104 and 110.

FIG. 5 is a top plan diagram illustrating an example pinnate drainage pattern 120 for accessing deposits in a subterranean zone. In this embodiment, pinnate drainage pattern 120 drains a substantially rectangular area 122 of the subterranean zone 15. Pinnate drainage pattern 120 includes a main drainage well bore 124 and a plurality of lateral bores 126 that are formed as described in connection with main drainage well bore 104 and lateral bores 110 of FIG. 4. For the substantially rectangular area 122, however, the lateral bores 126 on a first side of the main drainage well bore 124 include a shallow angle while the lateral bores 126 on the opposite side of the main drainage well bore 124 include a steeper angle to together provide uniform coverage of the area 12.

FIG. 6 is a top plan diagram illustrating an example quadrilateral pinnate drainage pattern 140 for accessing deposits in a subterranean zone. The quadrilateral drainage pattern 140 includes four discrete pinnate drainage patterns 100 each draining a quadrant of a region 142 covered by the pinnate drainage pattern 140.

Each of the pinnate drainage patterns 100 may include a main drainage well bore 104 and a plurality of lateral well bores 110 extending from the main drainage well bore 104. In the quadrilateral embodiment, each of the main drainage well bore and lateral bores 104 and 110 are drilled from a common articulated well bore 141. This allows tighter spacing of the surface production equipment, wider coverage of a drainage pattern and reduces drilling equipment and operations.

Figure 7:
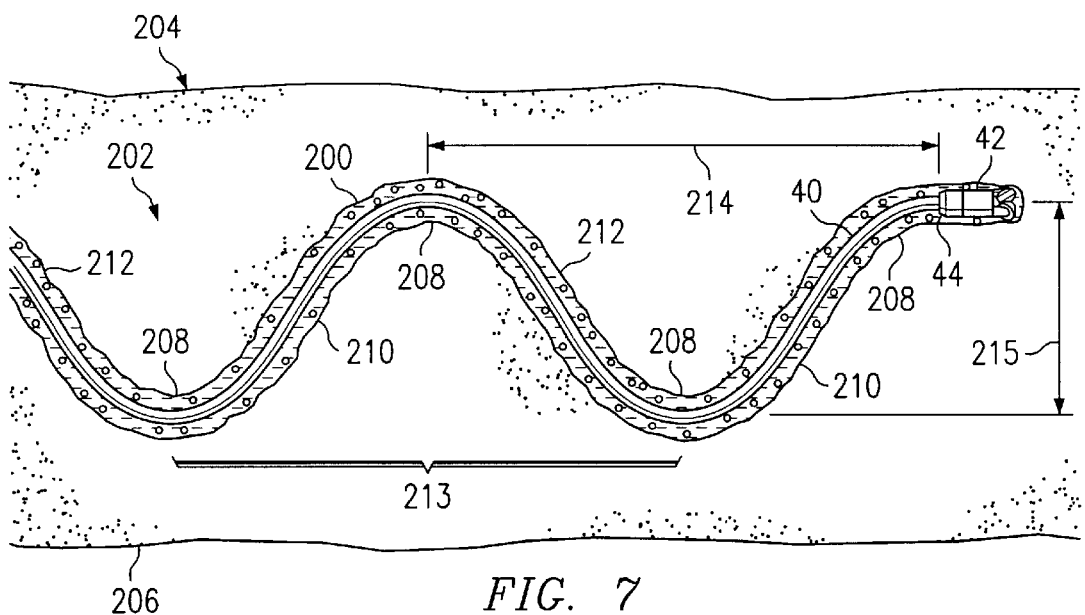
FIG. 7 is a cross-sectional diagram illustrating an example undulating well bore for accessing a layer of subterranean deposits.

FIG. 7 is a cross-sectional diagram illustrating an example undulating well bore 200 for accessing a layer of subterranean deposits 202. Undulating well bore 200 may be included as any well bore of the dual well system illustrated in FIGS. 1 through 6 or a well bore of any other system that may be used to remove and/or produce water, hydrocarbons and other fluids in a layer of subterranean deposits 202. Alternatively or additionally, undulating well bore 200 may be included as any well bore of a well bore system for the remediation or treatment of a contaminated area within or surrounding the coal seam or for the sequestration of gaseous pollutants and emissions in the coal seam. For example, undulating well bore may extend from a single vertical well or from a slant well. In a particular embodiment, the layer of subterranean deposits 202 may comprise a coal seam or other subterranean zone. Additionally or alternatively, the layer of subterranean deposits may comprise a thick, single layer of hydrocarbons or other extractable substances. For example, the single, thick layer of subterranean deposits 202 may be approximately fifty feet thick as measured from an upper boundary 204 closest to the earth's surface to a lower boundary 206 furthest from the earth's surface. Fifty feet is, however, merely exemplary. One skilled in the art may recognize that the layer of subterranean deposits 202 may be of any thickness in which an undulating well bore 200 may be contained. One skilled in the art may also recognize that the layer 202 may include any impurities that may be separated from the subterranean deposits before or after extraction. Additionally or alternatively, layer of subterranean deposits 202 may also include partings of shale or other impermeable or substantially impermeable material.

fIn one embodiment of the present invention, undulating well bore 200 may include at least one bending portion 208, at least one inclining portion 210, and at least one declining portion 212. Inclining portion 210 may be drilled at an inclination sloping toward upper boundary 204 of layer 202. Similarly, declining portion 212 may be drilled at a declination sloping toward lower boundary 206 of layer 202. Bending portions 208 may be located near the upper boundary 204 or lower boundary 206 and act to reverse the direction of the undulating well bore 200 to retain the undulating well bore 200 within the confines of the layer 202. In one example embodiment, bending portion 208 may include a substantially straight portion before reversing the direction of undulating well bore 202. Thus, the humps of undulating well bore 200 may be flat at the crest of bending portions 208. For example, a bending portion 208 located near the upper boundary 204 may level off and extend in a substantially horizontal plane closer to the upper boundary 204 for some distance before curving downward toward the lower boundary 206. Similarly, a bending portion 208 located near the lower boundary 206 may level off and extend in a substantially horizontal plane closer to the lower boundary 206 for some distance before curving upward toward the upper boundary 204. The three portions 208, 210, and 212 may couple to comprise a waveform 213 having a wavelength 214 and a wave height 215. The wavelength 214 may be measured from any point on waveform 213 to the next similar point on the waveform 213. For example, wavelength 214 may be measured from the top of the crest of a bending portion 208 located near the upper boundary 204 to the top of the crest of the next bending portion 208 located near the upper boundary 204. Alternatively, wavelength 214 may be measured from a point where bending portion 208 transitions to inclining portion 210 to the next point where bending portion 208 couples to the next inclining portion 210. Thus, one of ordinary skill in the art may recognize that wavelength 214 may be measured from any of a number of points on a waveform 213 to the next like point. Further, undulating well bore 200 may comprise one complete waveform 213, a portion of a waveform 213, or a plurality of waveforms 213.

In one embodiment of the present invention, undulating well bore 200 may comprise a substantially smooth and wavelike form. In this embodiment, displacement of undulating well bore 200 may vary over space in a periodic manner. Thus, the wavelength 214 of each waveform 213 may be substantially equal to the wavelength 214 of every other waveform 213. In this manner, the wavelength 214 of each waveform 213 may remain substantially constant throughout the length of undulating well bore 200. For example, the wavelength 214 of each waveform 213 may be six hundred feet. Alternatively, the wavelength 214 of each waveform 213 may be seven hundred feet or any other length for effectively accessing layer 202 of subterranean deposits. A wavelength 214 of six hundred or seven hundred feet is merely exemplary. Similarly, the wave height 215 of each waveform 213 may be substantially equal to the wave height 215 of every other waveform 213, and the wave height 215 of each waveform 213 may remain substantially constant throughout the entire undulating well bore 200. The wave height may relate to the thickness of layer 202. If for example layer 202 is eleven feet thick, the wave height 215 for each waveform 213 may be ten feet. One of ordinary skill in the art may recognize, however, that a wave height 215 of ten feet is merely exemplary. Wave height 215 may be unrelated to the thickness of layer 202 and may be of any height for effectively accessing layer 202 of subterranean deposits.

In an alternative embodiment, undulating well bore 200 need not have periodic characteristics. The displacement of undulating well bore 200 may vary over space in a non-uniform manner. The wavelength 214 of each waveform 213 may vary throughout the length of undulating well bore 200. For example, the wave length 214 of the first wave cycle may be six hundred feet, while the wave length 214 of the second waveform 213 may be seven hundred feet. Thus, the wave length 214 of each waveform 213 may vary throughout undulating well bore 200 and may be of any number of lengths for effectively accessing layer 202. Additionally or alternatively, the wave height 214 of each waveform 213 may vary such that the wave height 215 of a specific waveform 213 is different from the wave height 215 of the preceding waveform 213. For example, the wave height 215 of the first waveform 213 may be ten feet, while the wave height 215 of the second waveform 213 may be fifteen feet. One of ordinary skill in the art may recognize, however, that the above described wave heights 215 are merely exemplary. The wave height 215 of each waveform 213 may vary and be of any height for effectively accessing layer 202.

Further, although undulating well bore 200 is described as including a substantially smooth wavelike form, bending portions 208 may not necessarily be a perfect curve. For example, bending portions 208 may level off to include a substantially flat portion such that there is no single point of each bending portion 208 constituting an apex. Similarly, inclining portions 210 and declining portions 212 may not necessarily be perfectly straight. One of ordinary skill in the art may appreciate that a smooth and wavelike form may include normal inaccuracies of drilling. Because operation of a drill string 40 through a layer 202 of subterranean deposits may not be visually monitored, inaccuracies may result in the positioning of the drill bit 44. As a result, drill string 40 may vary slightly from the operator's intended path. Such minor variations and deviations do not change the substantially smooth characteristics of the undulating well bore 200. Rather, the minor variations and deviations are within the intended scope of the invention.

Figure 8:
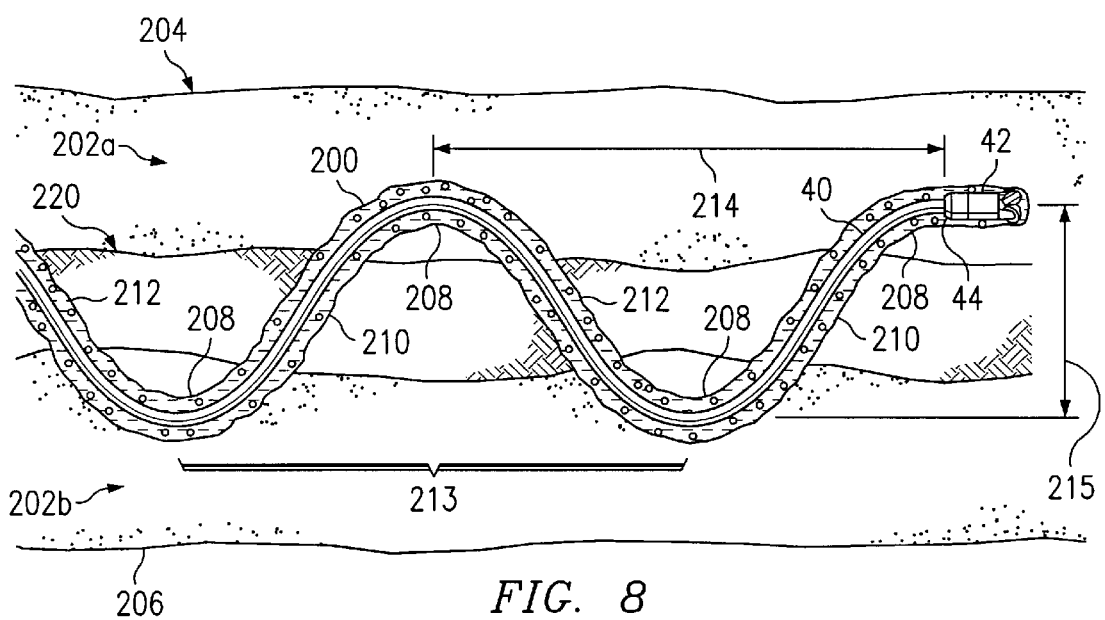
FIG. 8 is a cross-sectional diagram illustrating an example undulating well bore for accessing multiple layers of subterranean deposits.

FIG. 8 is a cross-sectional diagram illustrating an example undulating well bore 200 for accessing multiple layers 202 of subterranean deposits. Undulating well bore 200 may provide uniform access to multiple layers 202 of subterranean deposits that may be separated by impermeable or substantially impermeable material 220 such as sandstone, shale, or limestone. In this embodiment, bending portions 208, inclining portions 210, and declining portions 212 of undulating well bore 200 may be formed as previously described in connection with FIG. 7.

Referring again to FIG. 8, wave height 215 may be of a sufficient height to allow undulating well bore 200 to intersect multiple coal seams or multiple layers 202 of any other subterranean deposits. For example, bending portions 208 may alternate to reach an upper layer 202a of subterranean deposits and a lower layer 202b of subterranean deposits. Although only two layers 202a and 202b are shown in FIG. 8, undulating well bore 200 may intersect any appropriate number of layers 202. For example, inclining portions 210 and declining portions 212 may travel through a number of layers of subterranean deposits 202 separated by multiple layers of impermeable or substantially impermeable material 220. As will be described below, undulating well bore 200 may form some or all of a main drainage well bore 104 and/or a one or more lateral well bores 110. As was described with regard to FIG. 7, many modifications and variations may be made to undulating well bore 200. For example, the wave height 215 and wave length 214 of a waveform 213 may have periodic or non-periodic characteristics. Additionally, inaccuracies from drilling do not change the substantially smooth characteristics of the undulating well bore 200. These variations and modifications are within the intended scope of the invention.

Figure 9:
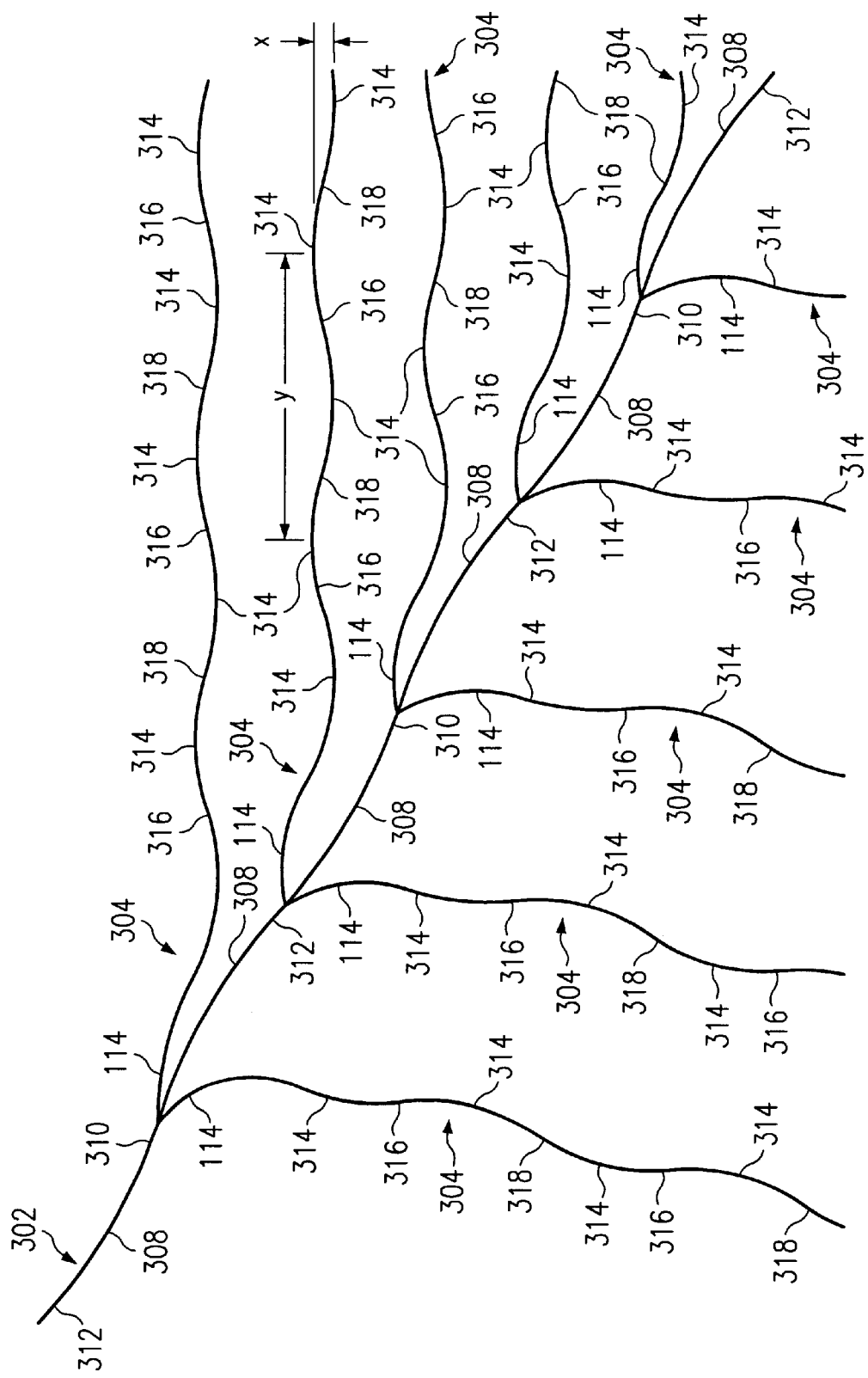
FIG. 9 is an isometric diagram illustrating an example drainage pattern of undulating well bores for accessing deposits in a subterranean zone.

FIG. 9 is an isometric diagram illustrating an example drainage pattern 300 of undulating well bores for accessing deposits in a subterranean zone. In the depicted embodiment, the substantially horizontal portions of both the main drainage well bore 104 and the lateral well bores 110, which are illustrated in FIG. 4, are replaced with undulating well bore 200. Thus as illustrated, system 10 includes an undulating main well bore 302 with undulating lateral well bores 304 for the removal and production of entrained water, hydrocarbons, and other deposits or for use in remediation of contaminated areas in or surrounding the coal seam. Alternatively, drainage pattern 300 may include, however, an undulating main drainage well bore 302 with substantially horizontal lateral well bores 110, a substantially horizontal main drainage well bore 104 with undulating lateral well bores 304, or any other combination thereof to remove and produce entrained water, hydrocarbons, and other subterranean deposits. As was previously described, pinnate drainage pattern 300 may provide access to a single, thick layer 202 of subterranean deposits as was described with regard to FIG. 7. Alternatively, the pinnate drainage pattern 300 may provide access to multiple layers 202 of subterranean deposits separated by impermeable or substantially impermeable material 220 such as sandstone, shale, or limestone, as was described with regard to FIG. 8.

In particular embodiments, undulating main drainage well bore 302 may replace the main drainage well bore 104, replace main well bore 50, or extend from the substantially horizontal portion 34 of articulated well bore 30 as was illustrated in FIG. 1. For example, after the enlarged diameter cavity 20 has been successfully intersected by the articulated well bore 30, drilling may continue through the cavity 20 using the articulated drill string 40 and appropriate horizontal drilling apparatus to form drainage pattern 300. Thus, undulating main drainage well bore 302 may initiate from cavity 20. During this operation, gamma ray logging tools and conventional MWD devices may be employed to control and direct the orientation of the drill bit to direct the undulating main drainage well bore 302 on its intended path through a layer or layers 202 of subterranean deposits.

Additionally, a plurality of lateral well bores 304 may extend from opposite sides of the undulating main drainage well bore 302 to a periphery of the area being drained. Thus, a first set of lateral well bores 304 may extend in spaced apart relation to each other from a first side portion of undulating well bore 302. Similarly, a second set of lateral well bores 304 may extend in spaced apart relation to each other from a second, opposite side portion of undulating main drainage well bore 302. The lateral well bores 304 may mirror each other on opposite sides of the undulating main drainage well bore 302 or may be offset from each other along the undulating main drainage well bore 302. In particular embodiments, pairs of lateral well bores 304 may be substantially evenly spaced on each side of the undulating main drainage well bore 302 and extend from the main drainage well bore 302 at an angle of approximately 45 degrees.

In a particular embodiment of the present invention, a pair of lateral well bores 304 may extend from opposite sides of the undulating main drainage well bore 302 at intervals corresponding to each wave for 213. For example, a pair of lateral well bores 304 may extend from each bending portion 308 located closest to the earth's surface 14. Additionally or alternatively, lateral well bores 304 may extend from each bending portion 308 located further from the earth's surface 14. Thus, some lateral well bores 304 may initiate near the surface 14, while other lateral well bores 304 may initiate away from the surface 14.

By initiating lateral well bores 304 from different depths within the subterranean zone, drainage pattern 300 may provide access to a single, thick layer 202 of subterranean deposits as was described with regard to FIG. 7. Alternatively, drainage pattern 300 may provide access to multiple layers 202 of subterranean deposits separated by impermeable or substantially impermeable material 220, as was described with regard to FIG. 8. In the latter embodiment, alternating bending portions 308 may be located in different layers of subterranean deposits. For example, the first bending portion 308 may be located in a layer 202a closer to the earth's surface while the second bending portion 308 may be located in a lower layer 202b further from the earth's surface. Lateral well bores 304 may extend from each bending portion 308 or from alternate bending portions 308. Consequently, the drainage pattern formed by undulating main drainage well bore 302 and lateral well bores 304 may be customized as is necessary to optimize the draining of the layer of subterranean deposits.

As previously described with regard to FIG. 4, each lateral well bore 304 may include a radiused portion 114 and an elongated portion 116. The radiused portion 114 may connect the lateral well bore 304 to the undulating main drainage well bore 302 at a predetermined radius of curvature. The appropriate radius of curvature may be dictated by drilling apparatus capabilities. In one embodiment of the present invention, the radius of curvature of the bending portion 308 of undulating main drainage well bore 302 may be substantially equal to the radius of curvature of the radiused portion 114 of lateral well bore 304. For example, if the radius of curvature for radiused portion 114 is three hundred feet, the radius of curvature for bending portions 308 may also be three hundred feet. Elongated portion 116 may then extend from the radiused portion 114 to the periphery of the area. A radius of curvature of three hundred feet is provided merely as an example. One skilled in the art may recognize that the radius of curvature may include any appropriate radius of curvature for effectively drilling lateral well bores 304.

Referring again to FIG. 9, lateral well bores 304 are depicted as extending from bending portions 308 of undulating main drainage well bore 302. Lateral well bores 304 may extend, however, from any portion of undulating main drainage well bore 302. Thus, lateral well bores 304 may additionally or alternatively extend from inclining portions 310 and/or declining portions 312. Further, although lateral well bores 304 may extend from undulating main drainage well bore 302 at evenly spaced intervals, lateral well bores 304 may extend from undulating well bore 302 at any interval. Thus, the horizontal distance between lateral well bores 304 along undulating main drainage well bore 302 may vary. Regardless of the location of or spacing between lateral well bores 304, lateral bores 304 may be formed by drilling through the enlarged cavity 20 using the articulated drill string 40 and an appropriate drilling apparatus. During this operation, gamma ray logging tools and conventional MWD technologies may be used to control the direction and orientation of the drill bit to maintain the desired spacing and orientation of the lateral well bores 304.

In particular example embodiments and as shown in FIG. 9, each lateral well bore 304 may comprise an undulating well bore 200. For example, undulating well bore 200 may replace the elongated portion 116 that is formed after the radiused portion 314 has reached a desired orientation. Each lateral well bore 304 may then include one or more bending portions 314, inclining portions 316, and/or declining portions 318. In a particular embodiment, the radius of curvature of bending portions 308 and/or 314 may be substantially equal to the radius of curvature of the radiused portion 114 that connects the lateral well bore 304 to the main drainage well bore 302. Alternatively, the radius of curvature of bending portions 308 and/or 314 may be different from the radius of curvature of radiused portion 114.

A number of variations and modifications may be made to drainage pattern 300. The present invention is intended to compass all such variations and modifications. Thus, FIG. 9 is merely an example embodiment of drainage pattern 300. Drainage pattern 300 may include an undulating main drainage well bore 304 with undulating lateral well bores 304, an undulating main drainage well bore 304 with substantially horizontal lateral well bores 110, a substantially horizontal main well bore 104 with undulating lateral well bores 304, or any other combination thereof to remove and produce entrained water, hydrocarbons, and other deposits, to treat contaminated areas within single, thick layer 202 of subterranean deposits, or to sequester gaseous emissions or pollutants within layer 202. Additionally, one skilled in the art may recognize, that portions of well bores described as substantially horizontal need not be perfectly horizontal. Where the layer 202 of subterranean deposits is not perfectly horizontal, the well bore may be drilled to conform with the planar orientation of the layer 202. For example, if layer 202 is inclined, the substantially horizontal well bore may also be inclined in conformity with the plane of the layer 202. Alternatively, if layer 202 slopes downwardly away from the earth's surface, the substantially horizontal well bore may also slope downwardly away from the earth's surface 14. One skilled in the art may also recognize that the length of the undulating well bores may be increased to maximize the area horizontally covered by the undulating well bores, and the height of the undulating well bores may be increased to maximize the area vertically covered by the undulating well bores.

FIG. 10 is a flow diagram illustrating an example method for producing gas from a subterranean zone. In this embodiment, the method begins at step 400 in which areas to be drained and drainage patterns to be used in the areas are identified. For example, drainage patterns 120, 140, or 300 may be used to provide optimized coverage for the region. It will be understood that any other suitable patterns may also or alternatively be used to degasify subterranean zone deposits in one or more layers 202.

Proceeding to step 402, the substantially vertical well 12 is drilled from the surface 14 through the subterranean zone. Next, at step 404, down hole logging equipment is used to exactly identify the location of the target layer 202 of subterranean deposits in substantially vertical well bore 12. At step 406, the enlarged diameter cavity 20 is formed in the substantially vertical well bore 12 at a location within the target layer 202 of subterranean deposits. As previously discussed, the enlarged diameter cavity 20 may be formed by under reaming and other conventional techniques. Next, at step 408, the articulated well bore 30 is drilled to intersect the enlarged diameter cavity 20. It should be understood that although the drilling of a dual well system is described in step 402–408, any other appropriate technique for drilling into subterranean deposits may be used. After the subterranean deposits are reached, a drainage pattern may then be drilled in the deposits, as described below.

At decisional step 410, it is determined whether main well bore 104 of the drainage pattern should comprise an undulating well bore 200. In making the determination, the size and accessibility of the layer or layers 202 of subterranean deposits should be considered. In a particular embodiments of the present invention, it may be desirable to drill a substantially straight main well bore 104. Alternatively, it may be desirable to drill an undulating main well bore 200, which may provide access to minerals within a single, thick layer 202 of subterranean deposits. Undulating main well bore 200 may also provide access to multiple layers 202 of subterranean deposits that may be separated by impermeable or substantially impermeable material 220 such as shale, limestone, or sandstone. If it is determined at decisional step 410 that the main well bore 104 should comprise an undulating well bore 202, the undulating well bore 202 is drilled at step 412. If, on the other hand, a substantially horizontal main well bore 104 is desired, a standard, straight main well bore 104 may be drilled at step 414.

At decisional step 416, a determination is made as to whether lateral well bores 110 should be drilled. Lateral well bores 110 may be drilled from the main well bore 104 or 202 and extended to a periphery of the area to be drained. Lateral well bores 110 may provide access to a greater area of the layer or layers 202 of subterranean deposits. If at decisional step 416, it is determined that lateral well bores 110 should not be drilled, steps 418 through 422 are skipped and the method proceeds directly to decisional step 424. Instead, if it is determined at decisional step 416 that lateral well bores 110 should be drilled, a determination is made at decisional step 418 as to whether one or more lateral well bore 110 should comprise an undulating well bore 202. In one embodiment of the present invention, it may be desirable to drill substantially straight lateral well bores 110. Alternatively, it may be desirable to drill undulating lateral well bores, which may provide access to minerals within a single, thick layer 202 of subterranean deposits or to minerals within multiple layers 202 of subterranean deposits separated by impermeable or substantially impermeable material 220. If it is determined that one or more lateral well bores 110 should comprise undulating well bores 202, undulating lateral well bores 304 are drilled at step 420. Alternatively, if it is determined at decisional step 418 that lateral well bores 110 should be drilled to include a substantially straight elongated portion 116, standard substantially straight well bores 110 are drilled at step 422. The method then proceeds to step 424.

At step 424, the articulated well bore 30 may be capped. Next, at step 426, the enlarged cavity 20 may be cleaned in preparation for installation of downhole production equipment. The enlarged diameter cavity 20 may be cleaned by pumping compressed air down the substantially vertical well bore 12 or by other suitable techniques. At step 428, production equipment is installed in the substantially vertical well bore 12. The production equipment may include a sucker rod pump extending down into the cavity 20. The sucker rod pump may be used to remove water from the layers 202 of subterranean deposits. The removal of water will drop the pressure of the subterranean layers 202 and allow gas to diffuse and be produced up the annulus of the substantially vertical well bore 12.

Proceeding to step 430, water that drains from the drainage pattern into the cavity 20 is pumped to the surface with the rod pumping unit. Water may be continuously or intermittently pumped as needed to remove it from the cavity 20. Additionally or alternatively, the drainage pattern may be used for environmental remediation purposes to treat or recover underground contaminants posing a danger to the environment. For example, the drainage pattern and cavity 20 may be used to inject a treatment solution into a contaminated coal seam or surrounding area, recover byproducts from the contaminated coal seam or surrounding area, or strip recoverable products. The drainage pattern may also be used for the sequestration of gaseous emissions. For example, gaseous emissions such as carbon dioxide entrained in a carrier medium may be injected into the pattern with the aid of a surface pump. At step 434, gas diffused from the subterranean zone is continuously collected at the surface 14. Upon completion of production, the method is completed.

Although the present invention has been described with several embodiments, numerous changes, substitutions, variations, alterations, transformations, and modifications may be suggested to one skilled in the art, and it is intended that the present invention encompass all such changes, substitutions, variations, alterations, transformations, and modifications as fall within the spirit and scope of the appended claims.

What is claimed is:

1. A subterranean drainage pattern for accessing an area of a subterranean zone comprising at least one undulating well bore, the undulating well bore confined within a single layer of subterranean deposits and comprising:
   at least one inclining portion drilled through the subterranean zone at an inclination sloping toward an upper boundary of the single layer of subterranean deposits;
   at least one declining portion drilled through the subterranean zone at a declination sloping toward a lower boundary of the single layer of subterranean deposits; and
   at least one bending portion coupling the at least one inclining portion and the at least one declining portion to form a waveform;
   wherein the drainage pattern comprises a plurality of waveforms varying over space in a substantially periodic manner.

2. The subterranean drainage pattern of claim 1, wherein the single layer comprises hydrocarbons.

3. The subterranean drainage pattern of claim 2, wherein the single layer comprises a coal seam.

4. The subterranean drainage pattern of claim 1, wherein the wavelength of each waveform is greater than six hundred feet.

5. The subterranean drainage pattern of claim 1, wherein the drainage pattern comprises a plurality of waveforms, the waveforms having substantially equal wave heights.

6. The subterranean drainage pattern of claim 5, wherein the wave height of each waveform is greater than ten feet.

7. The subterranean drainage pattern of claim 1, further comprising:
   an undulating main well bore extending from a surface well bore located at a first end of the layer to a second end of the layer;
   a first plurality of lateral well bores extending in spaced apart relation to each other from a first side portion of the undulating main well bore to the periphery of the area; and
   a second plurality of lateral well bores extending in spaced apart relation to each other from a second, opposite side portion of the undulating main well bore to the periphery of the area.

8. The subterranean drainage pattern of claim 7, wherein:
   each of the first plurality of lateral well bores extend from a bending portion of the undulating main well bore; and
   each of the second plurality of lateral well bores extend from a bending portion of the undulating main well bore.

9. The subterranean drainage pattern of claim 7, wherein the wavelength of a waveform is approximately twice the interval spacing between each lateral well bore on a side on the main well bore.

10. The subterranean drainage pattern of claim 7, wherein each lateral well bore comprises:
    a radiused portion extending from a bending portion of the undulating main well bore, the radiused portion comprising a radius of curvature that is substantially equal to a radius of curvature of the bending portion of the undulating well bore; and
    an elongated portion extending from the radiused portion to the periphery of the area.

11. The subterranean drainage pattern of claim 1, further comprising:
    a main well bore extending from a surface well bore located at a first end of the area of the subterranean zone to a second end of the area;
    a first plurality of lateral well bores extending in spaced apart relation to each other from a first side portion of the main well bore to the periphery of the area, the first plurality of lateral well bores comprising a plurality of undulating lateral well bores; and
    a second plurality of lateral well bores extending in spaced apart relation to each other from a second side portion of the main well bore to the periphery of the area, the second plurality of lateral well bores comprising a plurality of undulating lateral well bores.

12. The subterranean drainage pattern of claim 1, further comprising:
    an undulating main well bore extending from a surface well bore to define a first end of the layer to a second end of the layer;
    a first plurality of lateral well bores extending in spaced apart relation to each other from a first side portion of the undulating main well bore to the periphery of the area, the first plurality of lateral well bores comprising a plurality of undulating lateral well bores; and
    a second plurality of lateral well bores extending in spaced apart relation to each other from a second, opposite side portion of the undulating main well bore to the periphery of the area, the second plurality of lateral well bores comprising a plurality of undulating lateral well bores.

13. A method for accessing an area of a subterranean zone comprising at least one undulating well bore confined with a single layer of subterranean deposits, the method comprising:
    drilling at least one inclining portion of a well bore through the subterranean zone at an inclination sloping toward an upper boundary of the single layer of subterranean deposits;
    drilling at least one declining portion through the subterranean zone at a declination sloping toward a lower boundary of the single layer of subterranean deposits;
    drilling at least one bending portion coupling the at least one inclining portion and the at least one declining portion; and
    drilling a plurality of waveforms, each waveform comprising an inclining portion, a declining portion, and a bending portion, wherein the plurality of waveforms vary over space in a substantially periodic manner.

14. The method of claim 13, wherein the single layer comprises hydrocarbons.

15. The method of claim 14, wherein the single layer comprises a coal seam.

16. The method of claim 13, wherein the wavelength of each waveform is greater than six hundred feet.

17. The method of claim 13, wherein the plurality of waveforms have substantially equal wave heights.

18. The method of claim 17, wherein the wave height of each waveform is greater than ten feet.

19. The method of claim 13, further comprising:

drilling an undulating main well bore extending from a surface well bore located at a first end of the layer to a second end of the layer;

drilling a first plurality of lateral well bores extending in spaced apart relation to each other from a first side portion of the undulating main well bore to the periphery of the area; and drilling a second plurality of lateral well bores extending in spaced apart relation to each other from a second, opposite side portion of the undulating main well bore to the periphery of the area.

20. The method of claim 19, further comprising:

drilling each of the first plurality of lateral well bores extending from a bending portion of the undulating main well bore; and drilling each of the second plurality of lateral well bores extending from a bending portion of the undulating main well bore.

21. The method of claim 19, further comprising drilling the lateral well bores such that the wavelength of the waveform is approximately twice the interval spacing between each lateral well bore on a side of the main well bore.

22. The method of claim 19, wherein drilling each lateral well bore comprises:

drilling a radiused portion extending from a bending portion of the undulating main well bore, the radiused portion comprising a radius of curvature that is substantially equal to a radius of curvature of the bending portion of the undulating well bore; and drilling an elongated portion extending from the radiused portion to the periphery of the area.

23. The method of claim 13, further comprising:

drilling a main well bore extending from a surface well bore located at a first end of the layer to a second end of the layer;

drilling a first plurality of lateral well bores extending in spaced apart relation to each other from a first side portion of the main well bore to the periphery of the area, the first plurality of lateral well bores comprising a plurality of undulating lateral well bores; and forming a second plurality of lateral well bores extending in spaced apart relation to each other from a second side portion of the main well bore to the periphery of the area, the second plurality of lateral well bores comprising a plurality of undulating lateral well bores.

24. The method of claim 13, further comprising:

drilling an undulating main well bore extending from a surface well bore to define a first end of the layer to a second end of the layer;

drilling a first plurality of lateral well bores extending in spaced apart relation to each other from a first side portion of the undulating main well bore to the periphery of the area, the first plurality of lateral well bores comprising a plurality of undulating lateral well bores; and drilling a second plurality of lateral well bores extending in spaced apart relation to each other from a second side portion of the undulating main well bore to the periphery of the area, the second plurality of lateral well bores comprising a plurality of undulating lateral well bores.

* * * * *